(12) United States Patent
Tsukada et al.

(10) Patent No.: US 10,017,918 B2
(45) Date of Patent: Jul. 10, 2018

(54) WORKING MACHINE

(71) Applicant: KCM Corporation, Kako-gun, Hyogo (JP)

(72) Inventors: Yoko Tsukada, Tokyo (JP); Noritaka Itou, Tsuchiura (JP); Takashi Ikimi, Tsuchiura (JP); Satoru Kaneko, Tokyo (JP); Takashi Fujimoto, Tsuchiura (JP)

(73) Assignee: KCM Corporation, Hyogo (JP)

( * ) Notice: Subject to any disclaimer, the term of this patent is extended or adjusted under 35 U.S.C. 154(b) by 32 days.

(21) Appl. No.: 15/317,165

(22) PCT Filed: Feb. 26, 2015

(86) PCT No.: PCT/JP2015/055640
§ 371 (c)(1),
(2) Date: Dec. 8, 2016

(87) PCT Pub. No.: WO2015/190135
PCT Pub. Date: Dec. 17, 2015

(65) Prior Publication Data
US 2017/0130426 A1    May 11, 2017

(30) Foreign Application Priority Data

Jun. 9, 2014 (JP) ................................ 2014-118932

(51) Int. Cl.
*E02F 9/22* (2006.01)
*B60K 25/06* (2006.01)
(Continued)

(52) U.S. Cl.
CPC ............ *E02F 9/2292* (2013.01); *B60K 17/28* (2013.01); *B60K 25/06* (2013.01); *E02F 9/202* (2013.01);
(Continued)

(58) Field of Classification Search
CPC ....................... F15B 2211/35; B60K 2025/065
See application file for complete search history.

(56) References Cited

U.S. PATENT DOCUMENTS

| 7,269,944 B2 * | 9/2007 | Zhang ................... E02F 9/2217 60/414 |
| 8,667,786 B2 * | 3/2014 | Zimmermann ....... F03B 13/187 60/398 |

(Continued)

FOREIGN PATENT DOCUMENTS

| CN | 201825036 U | 5/2011 |
| CN | 102756636 A | 10/2012 |

(Continued)

OTHER PUBLICATIONS

International Search Report (PCT/ISA/210) issued in PCT Application No. PCT/JP2015/055640 dated Jun. 2, 2015 with English translation (three pages).

(Continued)

Primary Examiner — Nicole T Verley
(74) Attorney, Agent, or Firm — Crowell & Moring LLP

(57) ABSTRACT

Provided is a working machine capable of regenerating and utilizing surplus energy. The working machine related to the present invention is provided with a branching flow path (150) through which hydraulic oil flows between a hydraulic actuator (24) and a hydraulic pump-motor (14), an accumulator (30) arranged in the branching flow path, a first opening/closing valve (31) arranged between the accumulator and the hydraulic pump-motor, and a second opening/closing valve (32) arranged between the accumulator and the hydraulic actuator. A control device (41) selectively introduces the hydraulic oil from the hydraulic actuator and the hydraulic oil from the hydraulic pump-motor to the accumulator and accumulates the same by controlling opening/

(Continued)

closing of the first opening/closing valve and the second opening/closing valve.

8 Claims, 29 Drawing Sheets

(51) Int. Cl.
| | | |
|---|---|---|
| *B60K 17/28* | (2006.01) | |
| *E02F 9/20* | (2006.01) | |
| *F15B 11/04* | (2006.01) | |
| *F15B 21/14* | (2006.01) | |

(52) U.S. Cl.
CPC .......... *E02F 9/2217* (2013.01); *E02F 9/2253* (2013.01); *E02F 9/2267* (2013.01); *E02F 9/2289* (2013.01); *F15B 11/04* (2013.01); *F15B 21/14* (2013.01); *B60K 2025/065* (2013.01); *F15B 2211/35* (2013.01); *F15B 2211/625* (2013.01)

(56) References Cited

U.S. PATENT DOCUMENTS

| | | | | |
|---|---|---|---|---|
| 9,346,347 | B2* | 5/2016 | Gray, Jr. | ................... B60K 6/12 |
| 9,593,467 | B2* | 3/2017 | Kajita | ..................... F15B 21/14 |
| 9,598,842 | B2* | 3/2017 | Imura | ................... E02F 9/2095 |
| 9,611,619 | B1* | 4/2017 | Zimmerman | ........... F15B 1/027 |
| 9,790,659 | B2* | 10/2017 | Sugano | ................... F15B 11/17 |
| 2010/0141024 | A1 | 6/2010 | Fouquet et al. | |
| 2013/0178328 | A1 | 7/2013 | Arsenault et al. | |
| 2013/0280111 | A1 | 10/2013 | Hoxie et al. | |
| 2016/0032945 | A1* | 2/2016 | Cho | ........................ F15B 1/027 |
| | | | | 60/413 |
| 2016/0376770 | A1* | 12/2016 | Matsuzaki | ............ E02F 9/2217 |
| | | | | 60/414 |
| 2017/0284388 | A1* | 10/2017 | Caldwell | ................. F04B 49/22 |

FOREIGN PATENT DOCUMENTS

| | | |
|---|---|---|
| CN | 101704336 B | 1/2013 |
| CN | 102912821 A | 2/2013 |
| CN | 103042602 A | 4/2013 |
| CN | 102418354 B | 9/2013 |
| EP | 0 417 283 A1 | 3/1991 |
| EP | 0 754 883 A2 | 1/1997 |
| JP | 5-287774 A | 11/1993 |
| JP | 2005-96759 A | 4/2005 |
| JP | 2009-275772 A | 11/2009 |
| JP | 2013-133216 A | 7/2013 |

OTHER PUBLICATIONS

Japanese-language Written Opinion (PCT/ISA/237) issued in PCT Application No. PCT/JP2015/055640 dated Jun. 2, 2015 (three pages).

* cited by examiner

(a) WHEN DRIVEN BY ENGINE POWER

| No. | ACCELERATION/ DECELERATION STATE | PRESSURE STATE OF EACH SECTION | LIFT OPERATION STATE | FIRST SOLENOID VALVE(31) | SECOND SOLENOID VALVE(32) | THIRD SOLENOID VALVE(33) | FOURTH SOLENOID VALVE(34) |
|---|---|---|---|---|---|---|---|
| 31 | ACCELERATION/CONSTANT SPEED | — | STOP | × | × | × | × |
| 32 | DECELERATION | Pacc ≥ P14 | STOP | × | × | ○ | × |
| 33 | | Pacc < P14 | | ○ | × | × | ○ |
| 34 | — | Pacc ≥ Plf | MOVING-DOWN | × | × | × | × |
| 35 | | Pacc < Plf | | × | × | × | ○ |
| 36 | DECELERATION | P14 ≥ Pacc > Plf | MOVING-DOWN | ○ | × | × | ○ |
| 37 | | P14 < Pacc ≤ Plf | | × | ○ | × | ○ |
| 38 | DECELERATION | P14 ≥ Plf | MOVING-UP | ○ | ○ | × | × |
| 39 | | P14 < Plf | | × | × | × | × |
| 40 | ACCELERATION/ CONSTANT SPEED | P14 ≥ Plf | MOVING-DOWN | × | × | × | × |
| 41 | | P14 < Plf | | ○ | ○ | × | × |

(b) WHEN DRIVEN BY REGENERATIVE POWER OF ACCUMULATOR

| No. | ACCELERATION/ DECELERATION STATE | PRESSURE STATE OF EACH SECTION | LIFT OPERATION STATE | FIRST SOLENOID VALVE(31) | SECOND SOLENOID VALVE(32) | THIRD SOLENOID VALVE(33) | FOURTH SOLENOID VALVE(34) |
|---|---|---|---|---|---|---|---|
| 42 | ACCELERATION | Pacc ≥ P12 | STOP | ○ | × | × | ○ |
| 43 | | Pacc < P12 | | × | × | × | × |
| 44 | — | Pacc ≥ P21 | MOVING-UP | × | ○ | × | ○ |
| 45 | | Pacc < P21 | | × | × | × | × |

(REMARKS) ○ : OPEN
× : CLOSE

WORKING MACHINE

TECHNICAL FIELD

The present invention relates to a working machine that regenerates surplus energy.

BACKGROUND ART

As the background art of the present technical field, in Patent Literature 1 for example, a technology of a mechanical-hydraulic type transmission gear applied to a construction machine such as a power shovel is described. In concrete terms, there is described a technology of "a clutch pressure control valve is arranged, in the range where the rotational speed of the output shaft is higher than a predetermined value, the clutch of the mechanical type transmission gear is connected, the clutch of the hydraulic type transmission gear is disconnected, the power is transmitted to the output shaft by the mechanical type transmission gear having excellent transmission efficiency, whereas in the range where the rotational speed of the output shaft is lower than the predetermined value, the clutch of the mechanical type transmission gear is disconnected, the clutch of the hydraulic type transmission gear is connected, and the power is transmitted to the output shaft".

Also, according to this Patent Literature 1, there is described "at a high speed, the power loss can be reduced because the transmission efficiency is excellent, whereas at a low speed, the output rotational speed between normal rotation and reverse rotation can be controlled smoothly".

CITATION LIST

Patent Literature

PATENT LITERATURE 1: Description of European Patent Application Publication No. 0754883

SUMMARY OF INVENTION

Technical Problems

However, according to the technology described in Patent Literature 1, there is a problem that surplus energy generated when the vehicle decelerates or the load of the working device such as the bucket reduces for example cannot be regenerated.

The present invention has been developed in order to solve the problem described above, and its object is to provide a working machine that can regenerate and utilize surplus energy.

Solution to Problems

In order to achieve this object, the present invention is a working machine including a prime mover, a travel device, a working device including a hydraulic actuator, a first hydraulic pump that operates by power from the prime mover and feeds a hydraulic oil to the hydraulic actuator, a hydraulic pump-motor that drives the travel device, and a control device, and is characterized to include a branching flow path through which the hydraulic oil flows between the hydraulic actuator and the hydraulic pump-motor, an accumulator arranged in the branching flow path, a first opening/closing valve arranged between the accumulator and the hydraulic pump-motor, and a second opening/closing valve arranged between the accumulator and the hydraulic actuator, in which the control device selectively introduces the hydraulic oil from the hydraulic actuator and the hydraulic oil from the hydraulic pump-motor to the accumulator and accumulates pressure by controlling opening/closing of the first opening/closing valve and the second opening/closing valve.

According to the present invention, by arranging the branching flow path and arranging the accumulator in the branching flow path, the surplus energy of the hydraulic actuator generated at the time of load reduction of the working device can be stored in the accumulator as the regenerative energy, and the surplus energy of the hydraulic pump-motor generated at the time of deceleration of the travel device can be stored in the accumulator as the regenerative energy.

Also, the present invention is characterized in that the control device feeds the hydraulic oil accumulated in the accumulator selectively to the hydraulic actuator and the hydraulic pump-motor by controlling opening/closing of the first opening/closing valve and the second opening/closing valve in the configuration described above.

According to the present invention, the regenerative energy accumulated in the accumulator can be regenerated and can be utilized for assisting the motion of the hydraulic actuator or can be utilized for assisting the motor motion of the hydraulic pump-motor. Therefore, the surplus energy can be effectively utilized. This fact contributes also to improvement of the fuel efficiency.

Here, it is preferable that the present invention further includes a target speed command device that outputs a target speed command with respect to the travel device, an operation device that outputs a working command with respect to the working device, a first pressure detector that detects pressure between the first opening/closing valve and the hydraulic pump-motor, a second pressure detector that detects pressure between the first opening/closing valve and the second opening/closing valve, and a third pressure detector that detects pressure between the second opening/closing valve and the hydraulic actuator in the configuration described above.

In this case, in order to achieve effective utilization of the surplus energy and improvement of the fuel efficiency, the configurations described below can be employed.

That is to say, in the configuration described above, the control device can be configured to introduce the hydraulic oil from the hydraulic pump-motor to the accumulator and to accumulate pressure by actuating the hydraulic pump-motor as a pump, opening the first opening/closing valve, and closing the second opening/closing valve when the target speed command from the target speed command device is a deceleration command and a first pressure (P14) detected by the first pressure detector is higher than a second pressure (Pacc) detected by the second pressure detector.

In this case, it is preferable that the working machine is configured to further include a second hydraulic pump that operates by power from the prime mover and feeds the hydraulic oil to the hydraulic pump-motor, and a fourth pressure detector that detects discharge pressure of the second hydraulic pump in which, when the target speed command from the target speed command device is an acceleration command and the second pressure (Pacc) detected by the second pressure detector is higher than a fourth pressure (P12) detected by the fourth pressure detector, the control device feeds the hydraulic oil accumulated in the accumulator to the hydraulic pump-motor by actuating the hydraulic pump-motor as a motor, opening the first opening/closing valve, and closing the second opening/closing valve.

Also, in the configuration described above, the control device can be configured to introduce the hydraulic oil from the actuator to the accumulator and to accumulate pressure by opening the second opening/closing valve and closing the first opening/closing valve when the working command from the operation device is a load reduction command and a third pressure (Plf) detected by the third pressure detector is higher than the second pressure (Pacc) detected by the second pressure detector.

In this case, it is preferable that the working machine further includes a fifth pressure detector that detects a discharge pressure of the first hydraulic pump and the control device is configured to feed the hydraulic oil accumulated in the accumulator to the hydraulic actuator by opening the second opening/closing valve and closing the first opening/closing valve when the working command from the operation device is a load increase command and the second pressure (Pacc) detected by the second pressure detector is higher than a fifth pressure (P21) detected by the fifth pressure detector.

Also, the present invention is characterized in that, in the configuration described above, the working machine further includes a gear that transmits power from the prime mover to the travel device, a first clutch arranged between the travel device and the gear, a second clutch arranged between the travel device and the hydraulic pump-motor, and a speed detector that detects an actual speed of the travel device in which, when the actual speed detected by the speed detector is within a predetermined low speed range, the control device drives the travel device by the hydraulic pump-motor by disconnecting the first clutch and connecting the second clutch, whereas when the actual speed detected by the speed detector exceeds the low speed range, the control device drives the travel device by the prime mover by connecting the first clutch and disconnecting the second clutch.

According to the present invention, by executing torque transmission by hydraulic pressure at a low speed range and executing torque transmission mechanically at a high speed range, efficient power transmission can be achieved with a compact configuration.

Advantageous Effects of Invention

According to the present invention, the surplus energy generated at the time of traveling and at the time of working of the working machine can be regenerated and utilized. Therefore, useless energy consumption does not occur, and the fuel efficiency can be improved. Further, the problems, configurations and effects other than those described above will be clarified by explanation of the embodiments below.

BRIEF DESCRIPTION OF DRAWINGS

FIG. 9 is a drawing in which the motion of each clutch and each solenoid valve of every operation mode of a wheel loader related to the first embodiment is tabularized.

FIG. 19 is a drawing in which the motion of each solenoid valve of every operation mode of a wheel loader related to the second embodiment is tabularized.

DESCRIPTION OF EMBODIMENTS

Below, each embodiment of the present invention will be explained using the drawings.

First Embodiment

Figure 1:
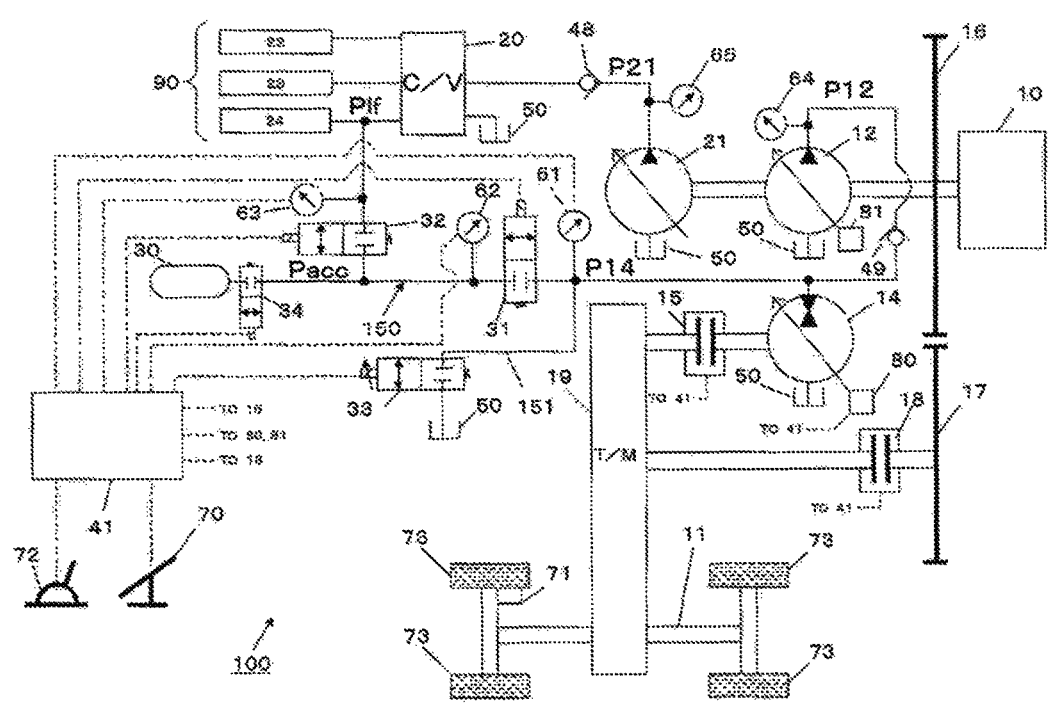
FIG. 1 is an overall block diagram of a wheel loader related to the first embodiment of the present invention.
Figure 30:
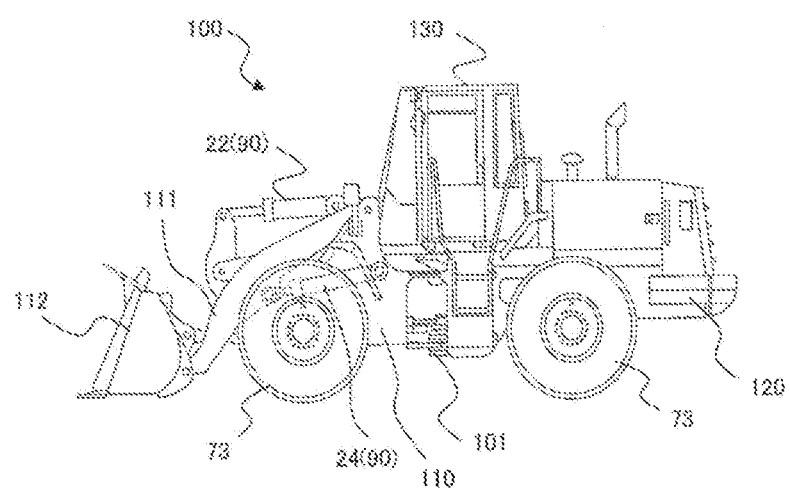
FIG. 30 is a side view of the wheel loader related to the first embodiment of the present invention.

FIG. 1 is an overall block diagram of a wheel loader related to the first embodiment of the present invention. Also, FIG. 30 is a side view of the wheel loader related to the first embodiment of the present invention. As shown in FIG. 1, a wheel loader 100 as an embodiment of a working machine related to the present invention is configured to make a vehicle travel by rotationally driving 4 sets of wheel 73 by the power of an engine 10 which is a prime mover. In concrete terms, the engine 10 is connected to a transmission 19 through a first gear 16 and a second gear 17, and the transmission 19 is connected to a propeller shaft 11. Therefore, when the engine 10 rotates, the power thereof is mechanically transmitted to the propeller shaft 11 through the first gear 16, the second gear 17, and the transmission 19, and the wheels 73 is rotationally driven by the power thereof.

Also, when the engine 10 is driven, a traveling hydraulic pump (second hydraulic pump) 12 connected to the engine 10 sucks the hydraulic oil from a hydraulic oil tank 50, and discharges the pressure oil toward a traveling hydraulic pump-motor 14. Further, with respect to the hydraulic oil, only one direction from the traveling hydraulic pump 12 toward the traveling hydraulic pump-motor is permitted by a check valve 49.

At this time, the traveling hydraulic pump-motor 14 operates as a motor, and is rotationally driven by the hydraulic oil (pressure oil). Because the propeller shaft 11 rotates through the transmission 19 by the drive force outputted from the traveling hydraulic pump-motor 14, the wheels 73 are rotationally driven.

In other words, the wheel loader 100 can make the vehicle travel by both means of the configuration of rotationally driving the wheels 73 by transmitting the power of the engine 10 to the transmission 19 through the first gear 16, the second gear 17, and a mechanical power clutch (hereinafter referred to as a mechanical clutch) 18 which are the mechanical type power transmission mechanisms, and the configuration of rotationally driving the wheels 73 by transmitting the power of the engine 10 to the transmission 19 through the traveling hydraulic pump 12, the traveling hydraulic pump-motor 14, and a hydraulic power clutch (hereinafter referred to as a hydraulic clutch) 15 which are the hydraulic type power transmission mechanisms. Also, the travel speed of the vehicle can be adjusted by the stepping amount of an accelerator pedal 70. The accelerator pedal 70 is arranged in a cab 130 (refer to FIG. 30).

Further, a speed detector 71 is attached to the wheel 73, and the actual speed of the wheel 73 can be detected by the speed detector 71. Also, a regulator 81 for tilting a swash plate is arranged in the traveling hydraulic pump 12, a regulator 80 for tilting a swash plate is arranged in the traveling hydraulic pump-motor 14, and the regulators 80, 81 control the angle of the swash plate based on the control signal from a controller 41.

Further, when the engine 10 is driven, a front operation hydraulic pump (first hydraulic pump) 21 operates. The front operation hydraulic pump 21 sucks the hydraulic oil from the hydraulic oil tank 50, and discharges the pressure oil to a control valve 20. The pressure oil from this front operation hydraulic pump 21 is fed to a working device 90 through the control valve (C/V) 20. Also, with respect to the hydraulic oil, only one direction from the front operation hydraulic pump 21 toward the control valve 20 is permitted by a check valve 48. Further, the traveling hydraulic pump 12 and the front operation hydraulic pump 21 are of a variable displacement type. Also, the traveling hydraulic pump-motor 14 is a double-tilting pump-motor of a variable displacement type.

As shown in FIG. 30, the working device 90 is configured to include a bucket cylinder 22 which is a hydraulic actuator driving a bucket 112, a steering cylinder 23 (refer to FIG. 1) which is a hydraulic actuator for bending the vehicle body through a center joint 101, and a lift cylinder 24 which is a hydraulic actuator driving a lift arm 111.

As shown in FIG. 30, the lift arm 111 is attached to a front vehicle body 110 so as to be vertically turnable, and is turnably driven by drive of the lift cylinder 24. The bucket 112 is attached to the lift arm 111 so as to be vertically turnable at the distal end of the lift arm 111, and is turnably driven by drive of the bucket cylinder 22. The front vehicle body 110 and a rear vehicle body 120 are connected by the center joint 101 so as to be mutually turnable, and the front vehicle body 110 is bent to the left and right with respect to the rear vehicle body 120 by expansion and contraction of the steering cylinder 23. Also, operation of the working device 90 is executed by an operating lever 72 arranged within the cab 130.

Further, according to the present embodiment, a branching flow path 150 is arranged through which the hydraulic oil flows between the traveling hydraulic pump-motor 14 and the lift cylinder 24. The branching flow path 150 is formed so as to connect the traveling hydraulic pump-motor 14 and the lift cylinder 24 by hydraulic piping, and is configured to be capable of making the hydraulic oil flow into the branching flow path 150 from both of the traveling hydraulic pump-motor 14 side and the lift cylinder 24 side.

Also, an accumulator 30 is arranged in the branching flow path 150. The accumulator 30 has a construction of being capable of accumulating the hydraulic oil at a predetermined pressure. At the inlet of the accumulator 30, a fourth solenoid valve 34 is arranged which is an opening/closing valve of the electro-magnetic type. The fourth solenoid valve 34 opens when the hydraulic oil (pressure oil) is introduced to the accumulator 30, and closes while the hydraulic oil is stored within the accumulator 30.

Also, a second solenoid valve (second opening/closing valve) 32 which is an opening/closing valve of the electro-magnetic type is arranged between the accumulator 30 and the lift cylinder 24, and a first solenoid valve (first opening/closing valve) 31 which is an opening/closing valve of the electro-magnetic type is arranged between the accumulator 30 and the traveling hydraulic pump-motor 14. Further, in the branching flow path 150, a discharge flow path 151 is arranged which is for branching from a position between the traveling hydraulic pump-motor 14 and the first solenoid valve 31 and discharging the hydraulic oil to the hydraulic oil tank 50, and a third solenoid valve 33 is arranged in this discharge flow path 151. This third solenoid valve 33 is an opening/closing valve of the proportional type, closes normally, and opens at a predetermined opening when the hydraulic oil within the branching flow path 150 is recovered to the hydraulic oil tank 50.

Between the traveling hydraulic pump-motor 14 and the first solenoid valve 31, a first pressure detector 61 is arranged which is for detecting the pressure P14 (first pressure) which is the discharge pressure of the traveling hydraulic pump-motor 14 in the case the traveling hydraulic pump-motor 14 operates as a pump. Between the first solenoid valve 31 and the second solenoid valve 32, a second pressure detector 62 is arranged which is for detecting the pressure Pacc (second pressure) of the accumulator 30. Between the lift cylinder 24 and the second solenoid valve 32, a third pressure detector 63 is arranged which is for detecting the pressure Plf (third pressure) of the hydraulic oil returned from the lift cylinder 24. Also, a fourth pressure detector 64 for detecting the discharge pressure P12 (fourth pressure) of the traveling hydraulic pump 12 and a fifth pressure detector 65 for detecting the discharge pressure P21 (fifth pressure) of the front operation hydraulic pump 21 are arranged.

Figure 2:
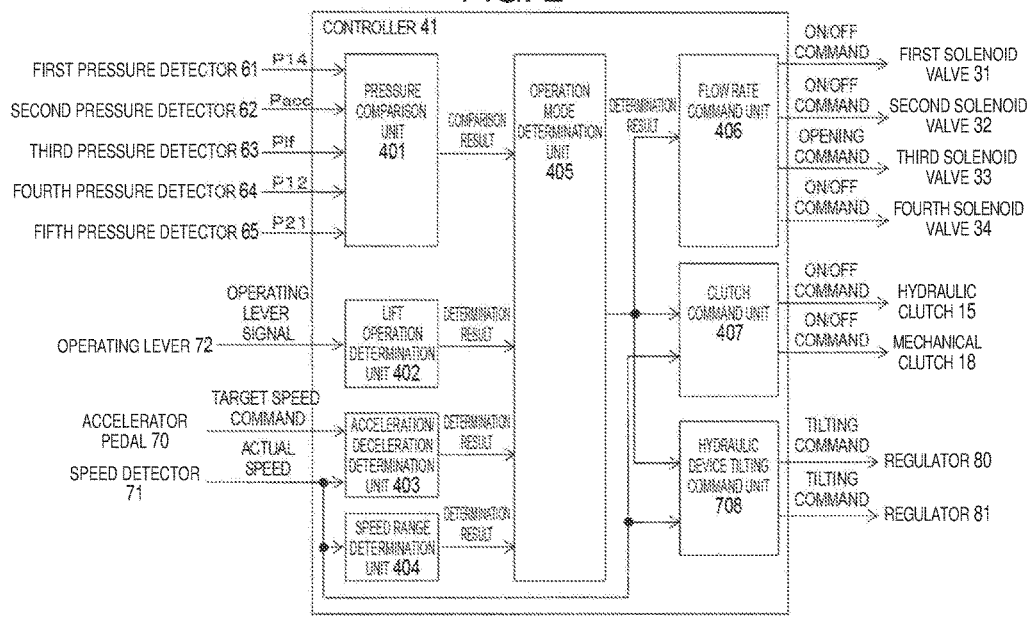
FIG. 2 is a block diagram showing the detail of a controller shown in FIG. 1.

Next, the detail of the controller 41 will be explained. FIG. 2 is a block diagram showing the detail of the controller 41. As shown in FIG. 2, the controller 41 includes a pressure comparison unit 401, a lift operation determination unit 402, an acceleration/deceleration determination unit 403, a speed range determination unit 404, an operation mode determination unit 405, a flow rate adjust command unit 406, a clutch command unit 407, and a hydraulic device tilting command unit 408.

The pressure comparison unit 401 compares the magnitude of each pressure P14, Pacc, Plf, P12, and P21 with the pressure signal from the first pressure detector 61 to the fifth pressure detector 65 being made an input, and the comparison result thereof is outputted to the operation mode determination unit 405.

The lift operation determination unit 402 determines the motion state of the lift arm 111 with the operating lever signal (working command) from the operating lever 72 being made an input, and the determination result thereof is outputted to the operation mode determination unit 405.

The acceleration/deceleration determination unit 403 determines acceleration/deceleration of the vehicle with the target speed command (the stepping amount of the accelerator pedal 70) from the accelerator pedal 70 as the target speed command device and the signal of the actual speed from the speed detector 71 arranged in the wheel 73 being made an input, and the determination result thereof is outputted to the operation mode determination unit 405.

The speed range determination unit 404 determines whether the speed range of the vehicle is in the low speed range or the high speed range with the signal of the actual speed from the speed detector 71 being made an input, and the determination result thereof is outputted to the operation mode determination unit 405. Also, the reference (threshold) for determining the low speed range and the high speed range is determined beforehand.

The operation mode determination unit 405 determines the operation mode of the vehicle which will be described in detail below based on the comparison result and the determination result described above, and the determination result thereof is outputted to the flow rate adjust command unit 406 and the clutch command unit 407.

The flow rate adjust command unit 406 outputs the command on the opening/closing motion of the solenoid valves 31, 32, 33, 34 according to the determination result outputted from the operation mode determination unit 405. To be more specific, the ON/OFF signal (opening/closing signal) is outputted to the first solenoid valve 31, the second solenoid valve 32, and the fourth solenoid valve 34, and a command on the valve opening (opening command) is outputted to the third solenoid valve 33.

The clutch command unit 407 outputs the command of ON (connection)/OFF (disconnection) to the hydraulic clutch 15 and a mechanical clutch 18 based on the determination result outputted from the operation mode determination unit 405 and the information of the actual speed outputted from the speed detector 71.

The hydraulic device tilting command unit 408 outputs the tilting command signal for the swash plate to the regulator 80 of the traveling hydraulic pump-motor 14 and the regulator 81 of the traveling hydraulic pump 12 based on the determination result outputted from the operation mode determination unit 405 and the information of the actual speed outputted from the speed detector 71. Thus, the discharge flow rates of the traveling hydraulic pump-motor 14 and the traveling hydraulic pump 12 are controlled.

Figure 3:
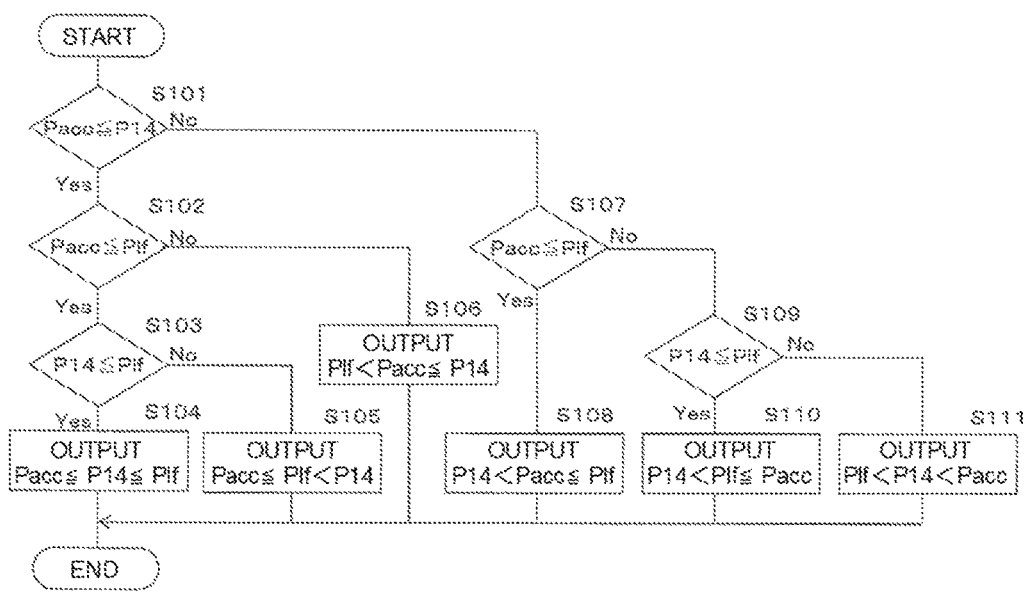
FIG. 3 is a flowchart showing a procedure of a process of executing comparison of pressure Pacc, pressure P14, and pressure Plf by a pressure comparison unit shown in FIG. 2.
Figure 5:
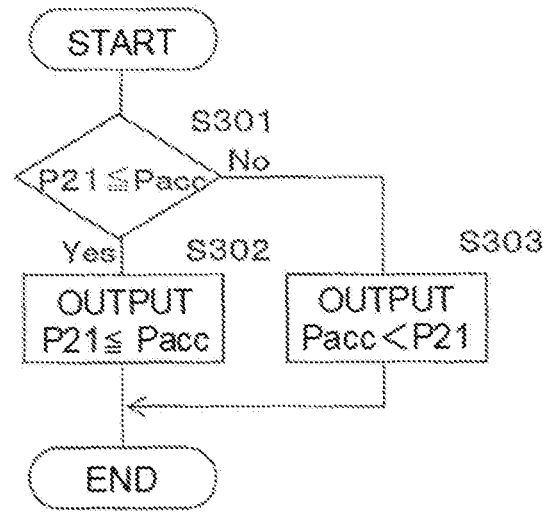
FIG. 5 is a flowchart showing a procedure of a process of executing comparison of pressure Pacc and pressure P21 by the pressure comparison unit shown in FIG. 2.
Figure 6:
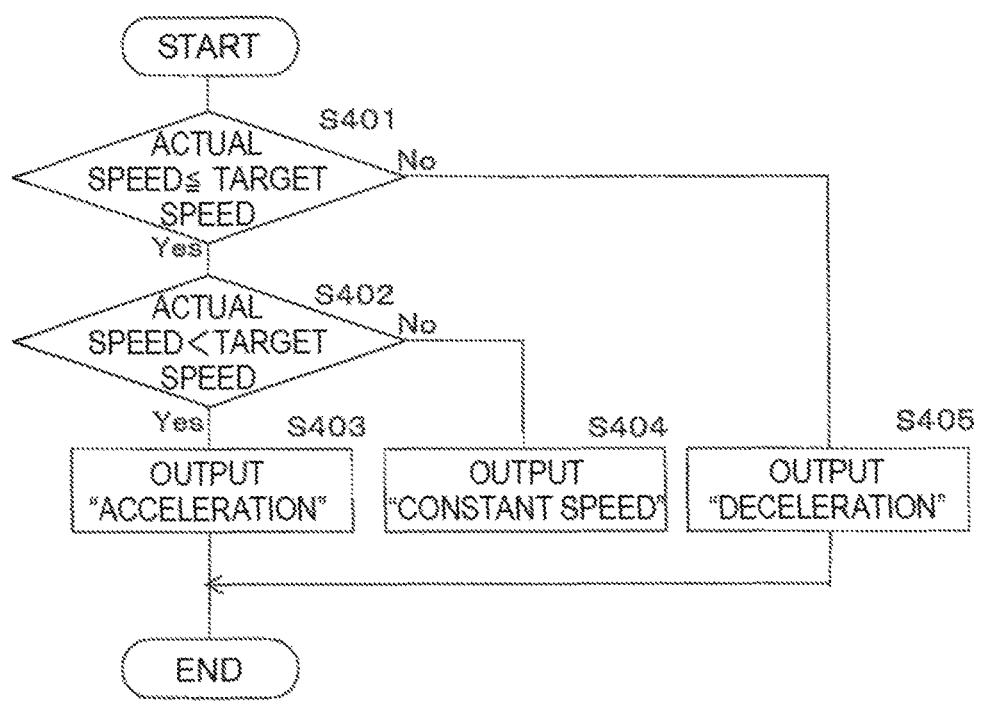
FIG. 6 is a flowchart showing a procedure of a process of determining a state of acceleration/deceleration of a vehicle by an acceleration/deceleration determination unit shown in FIG. 2.
Figure 7:
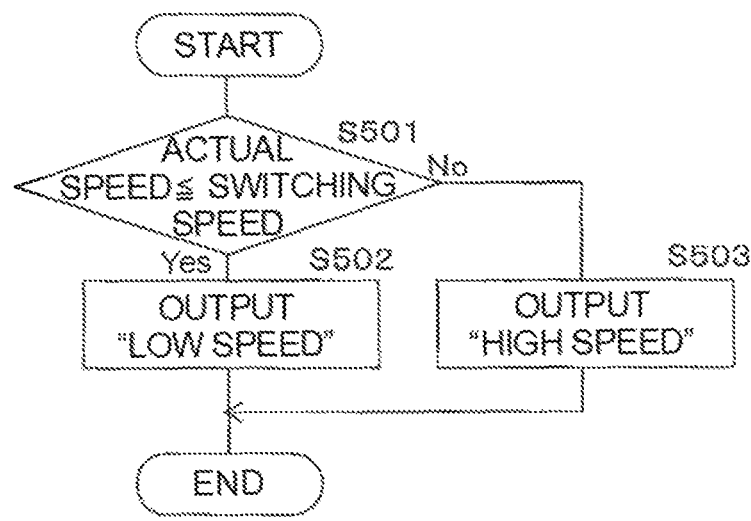
FIG. 7 is a flowchart showing a procedure of a process of determining a speed range of a vehicle by a speed range determination unit shown in FIG. 2.
Figure 8:
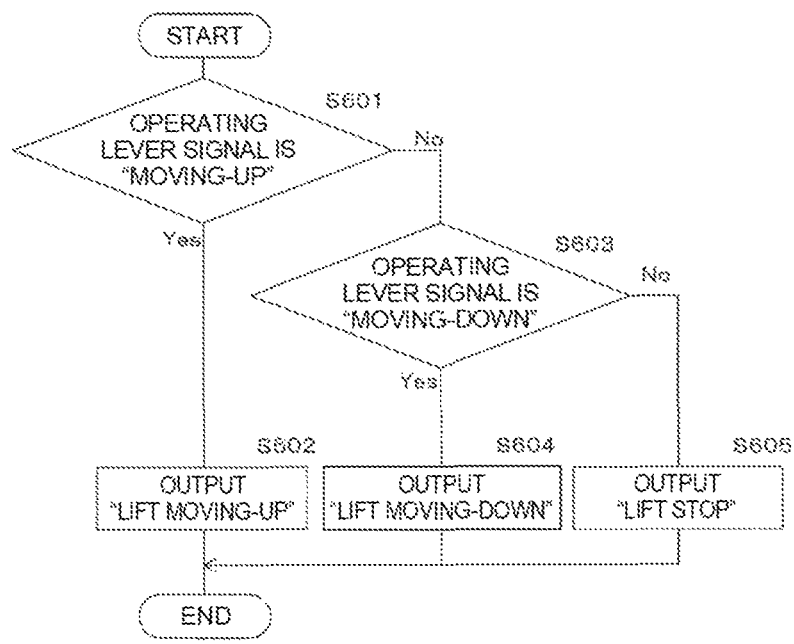
FIG. 8 is a flowchart showing a procedure of a process of determining the motion state of a lift arm by a lift operation determination unit shown in FIG. 2.
Figure 10:
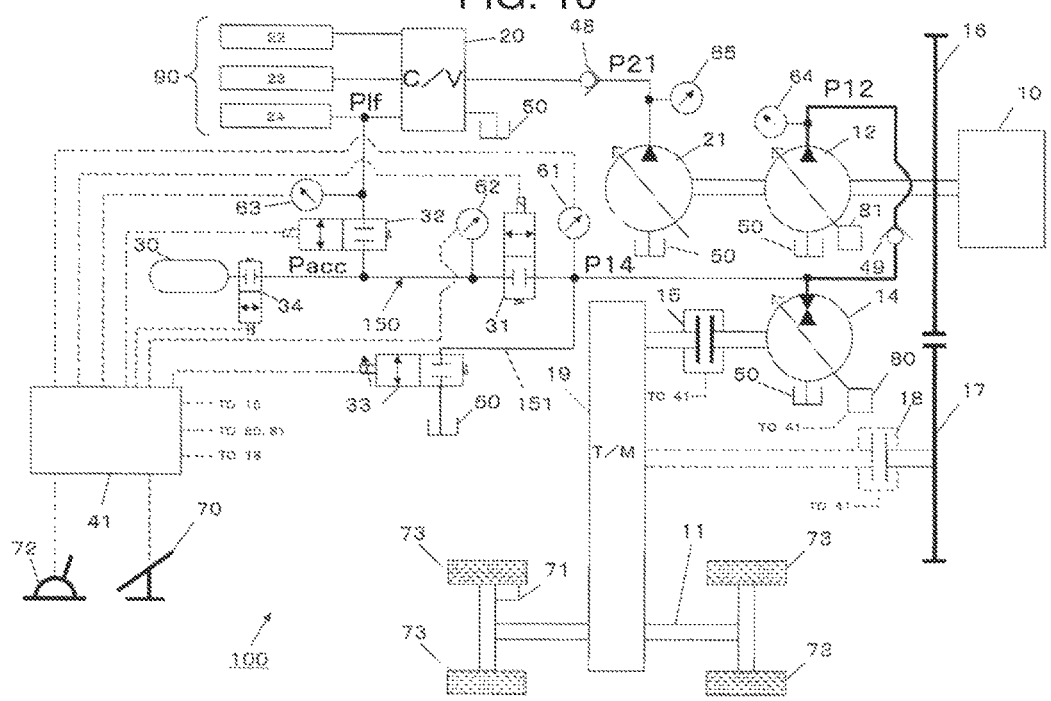
FIG. 10 is a drawing showing the flow of the hydraulic oil in the operation mode No. 1.

Next, the concrete process flow of each processing unit will be explained using FIG. 3-FIG. 8. FIG. 3 is a flowchart showing a procedure of a process of executing comparison of pressure Pacc, pressure P14, and pressure Plf by the pressure comparison unit 401, FIG. 4 is a flowchart showing a procedure of a process of executing comparison of pressure Pacc and pressure P12 by the pressure comparison unit 401, FIG. 5 is a flowchart showing a procedure of a process of executing comparison of pressure Pacc and pressure P21 by the pressure comparison unit 401, FIG. 6 is a flowchart showing a procedure of a process of determining the state of acceleration/deceleration of a vehicle by the acceleration/deceleration determination unit 403, FIG. 7 is a flowchart showing a procedure of a process of determining the speed range of a vehicle by the speed range determination unit 404, and FIG. 8 is a flowchart showing a procedure of a process of determining the motion state of a lift arm by the lift operation determination unit 402.

As shown in FIG. 3, when pressure Pacc is equal to or lower than pressure P14 (S101/Yes), pressure Pacc is equal to or lower than pressure Plf (S102/Yes), and pressure P14 is equal to or lower than pressure Plf (S103/Yes), the pressure comparison unit 401 outputs Pacc≤P14≤Plf (S104). On the other hand, when pressure P14 is higher than Plf (S103/No), the pressure comparison unit 401 outputs Pacc≤Plf<P14 (S105). Also, when pressure Pacc is higher than Plf (S102/No), the pressure comparison unit 401 outputs Plf<Pacc≤P14 (S106).

When pressure Pacc is higher than P14 (S101/No), the pressure comparison unit 401 determines whether pressure Pacc≤Plf is satisfied in S107, in the case of Yes, P14<Pacc≤Plf is outputted (S108), and in the case of No, whether P14≤Plf is satisfied is determined in S109. Also, in the case of Yes in S109, the pressure comparison unit 401 outputs P14≤Plf<Pacc (S110), and in the case of No, Plf<P14<Pacc is outputted (S111).

Figure 4:
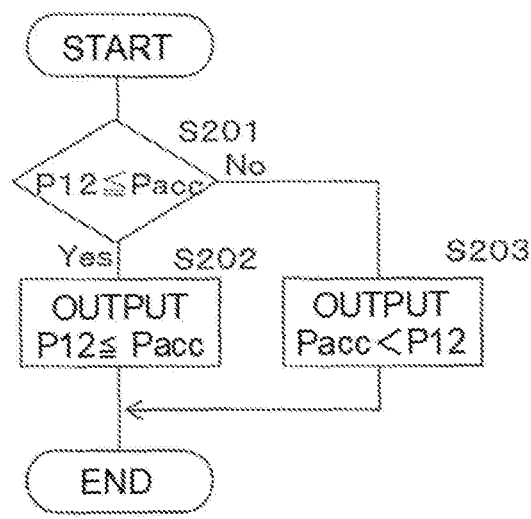
FIG. 4 is a flowchart showing a procedure of a process of executing comparison of pressure Pacc and pressure P12 by the pressure comparison unit shown in FIG. 2.

Further, as shown in FIG. 4, the pressure comparison unit 401 compares the magnitude of pressure P12 and pressure Pacc (S201), when pressure P12 is equal to or lower than pressure Pacc (S201/Yes), P12≤Pacc is outputted (S202), and if not (S201/No), Pacc<P12 is outputted (S203).

Also, as shown in FIG. 5, the pressure comparison unit 401 compares the magnitude of pressure P21 and pressure Pacc (S301), when pressure P21 is equal to or lower than pressure Pacc (S301/Yes), P21≤Pacc is outputted (S302), and if not (S301/No), Pacc<P21 is outputted (S303).

As shown in FIG. 6, the acceleration/deceleration determination unit 403 compares the actual speed from the speed detector 71 and the target speed command from the accelerator pedal 70 (S401), when the actual speed is lower than the target speed (S402/Yes), "accelerate" (acceleration command) is outputted (S403), when the actual speed is equal to the target speed (S402/No), "constant speed" is outputted (S404), and when the actual speed is higher than the target speed (S401/No), "decelerate" (deceleration command) is outputted (5405).

As shown in FIG. 7, the speed range determination unit 404 compares the actual speed from the speed detector 71 and the switch speed (S501), when the actual speed is equal to or lower than the switch speed (S501/Yes), "low speed" is outputted (S502), and when the actual speed is higher than the switch speed (S501/No), "high speed" is outputted (S503). Also, the switch speed means the vehicle speed which becomes the reference (threshold) of switching from the hydraulic clutch 15 to the mechanical clutch 18.

As shown in FIG. 8, the lift operation determination unit 402 determines whether the operating lever signal from the operating lever 72 is the command (load increase command) of the moving-up motion of the lift arm 111 (S601), if Yes, lift moving-up is outputted as the information of the lift motion (S602), and if No, whether or not the operating lever signal is the command (load reducing command) of the moving-down motion of the lift arm 111 (S603) is determined. In the case of Yes in S603, the lift operation determination unit 402 outputs lift moving-down as the information of the lift motion (S604), and in the case of No, lift stop is outputted as the information of the lift motion (S605).

Figure 9:
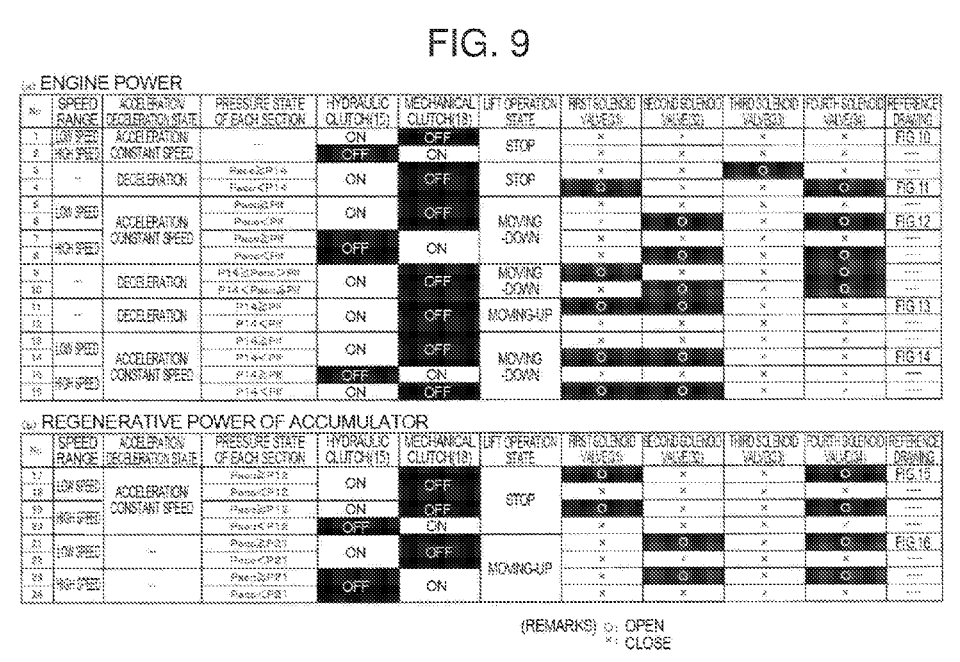

Next, the operation mode of the wheel loader 100 will be explained. FIG. 9 tabularizes the motion of the clutches 15, 18 and the solenoid valves 31 to 34 of each operation mode of the wheel loader 100. Also, FIG. 10 to FIG. 16 show the flow of the hydraulic oil using the overall block diagram with respect to the representative one of the operation mode shown in FIG. 9. Also, in the present embodiment, it is configured that the map data on the operation mode shown in FIG. 9 are stored in the operation mode determination unit 405 and the operation mode determination unit 405 selects, based on various inputs, corresponding operation mode and controls the vehicle, however, it may also be configured that the map data are not stored and the operation mode determination unit 405 determines the operation mode by calculation every time based on various inputs.

<Operation Mode No. 1 (Refer to FIG. 10)>

The operation mode No. 1 is a state the wheel loader 100 is traveling accelerating or at a constant speed in the low speed range and the lift motion is stopped. In this state, the controller 41 makes the hydraulic clutch 15 "ON (connection)" and the mechanical clutch 18 "OFF (disconnection)", and feeds the hydraulic oil from the traveling hydraulic pump 12 to the traveling hydraulic pump-motor 14. Also, the controller 41 activates the traveling hydraulic pump-motor 14 as a motor, and makes the vehicle travel. In this mode, the first solenoid valve 31 is made "close", the second solenoid valve 32 is made "close", the third solenoid valve 33 is made "close", and the fourth solenoid valve 34 is made "close". Also, the mechanical clutch 18 illustrated by the dotted line shows that it is in the OFF (disconnection) state.

In this operation mode No. 1, by making the hydraulic clutch 15 "ON" and the mechanical clutch 18 "OFF", torque transmission in the low speed range is executed hydraulically, and therefore efficient power transmission can be achieved with a compact configuration.

To be more specific, when the power transmission is executed by the gears 16, 17 in the low speed range where high torque is required, there are a problem that the gear ratio should be increased and the system becomes large, a problem that, when the torque converter is used, the difference of the input and output rotational speed becomes large, and therefore the efficiency drops, and a problem that, when the power transmission is executed electrically, because of the low output, the efficiency drops, however, in the present embodiment, because the torque transmission is executed hydraulically in the low speed range, such problems are solved.

<Operation Mode No. 2>

The operation mode No. 2 is a state the wheel loader 100 is traveling accelerating or at a constant speed in the high speed range and the lift motion is stopped. In this state, the controller 41 makes the hydraulic clutch 15 "OFF (disconnection)" and the mechanical clutch 18 "ON (connection)", and makes the first solenoid valve 31 "close", the second solenoid valve 32 "close", the third solenoid valve 33 "close", and the fourth solenoid valve 34 "close".

When the speed range of the engine 10 is the high speed range, because it is sufficient to transmit a low torque, in this operation mode, the power of the engine 10 is transmitted to the wheels 73 using the gears 16, 17 and the mechanical clutch 18, and thereby the power transmission efficiency is increased.

<Operation Mode No. 3>

The operation mode No. 3 is a state the wheel loader 100 is traveling decelerating and the lift motion is stopped, and therefore the controller 41 operates the regulator 80 of the traveling hydraulic pump-motor 14 and activates the traveling hydraulic pump-motor 14 as a pump by rotation of the propeller shaft 11. At this time, the controller 41 makes the hydraulic clutch 15 "ON" and the mechanical clutch 18 "OFF".

Because this operation mode is a state the relation between pressure P14 detected by the first pressure detector 61 (namely the discharge pressure of the traveling hydraulic pump-motor 14) and pressure Pacc detected by the second pressure detector 62 (namely the pressure inside the accumulator 30) satisfies "Pacc≥P14", the controller 41 switches the third solenoid valve 33 to "open", and returns the hydraulic oil to the hydraulic oil tank 50. At this time, the first solenoid valve 31 is "close", the second solenoid valve 32 is "close", and the fourth solenoid valve 34 is "close". Thus, when pressure P14 is equal to or lower than pressure Pacc, the hydraulic oil cannot be accumulated in the accumulator 30, and therefore the hydraulic oil discharged from the traveling hydraulic pump-motor 14 is recovered to the hydraulic oil tank 50 through the discharge flow path 151.

<Operation Mode No. 4 (Refer to FIG. 11)>

The operation mode No. 4 is a state the wheel loader 100 is traveling decelerating and the lift motion is stopped, and therefore the controller 41 operates the regulator 80 of the traveling hydraulic pump-motor 14 and activates the traveling hydraulic pump-motor 14 as a pump by rotation of the propeller shaft 11. At this time, the controller 41 makes the hydraulic clutch 15 "ON" and the mechanical clutch 18 "OFF".

Figure 11:
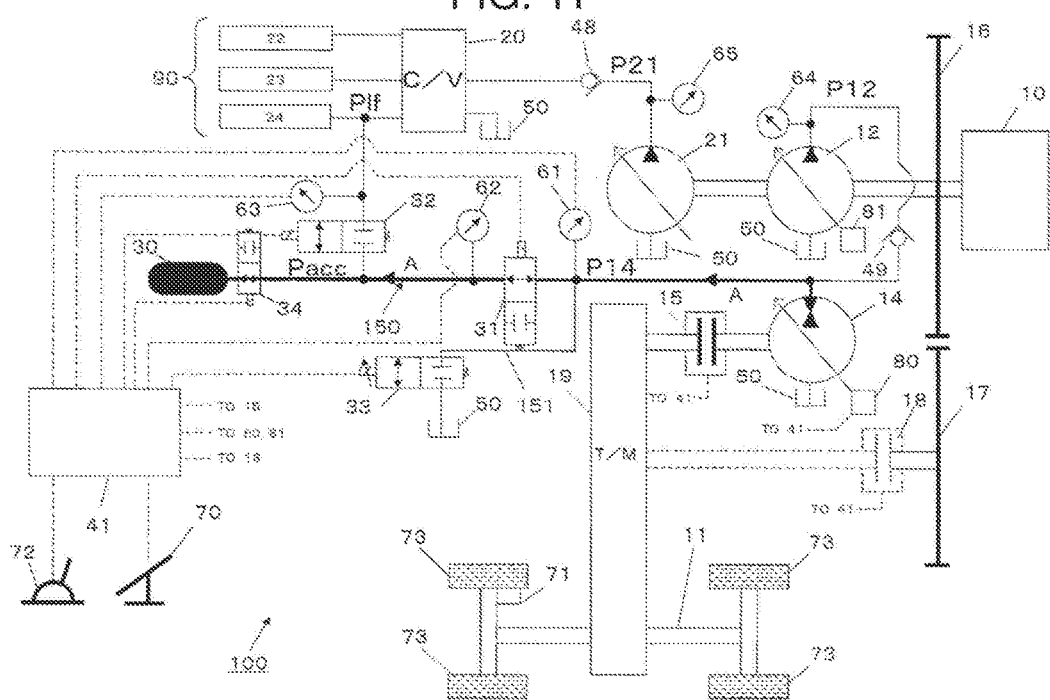
FIG. 11 is a drawing showing the flow of the hydraulic oil in the operation mode No. 4.

Because this operation mode is a state the relation between pressure P14 and pressure Pacc satisfies "Pacc<P14", the controller 41 switches the first solenoid valve 31 to "open", and the fourth solenoid valve 34 to "open". At this time, the second solenoid valve 32 is "close", and the third solenoid valve 33 is "close". Then, as shown in FIG. 11, the hydraulic oil flows to the direction of arrow A inside the branching flow path 150 by the pressure difference, and is accumulated in the accumulator 30. Thus, the energy generated at the time of deceleration of the vehicle can be stored in the accumulator 30 as the regenerative energy. Also, in FIG. 11, the accumulator 30 illustrated in black shows that it is in the accumulating state.

Also, by controlling the hydraulic clutch 15 so as to become "ON" and the mechanical clutch 18 so as to become "OFF" constantly at the time of deceleration regardless of the magnitude of the vehicle speed, more regenerative energy can be obtained.

<Operation Mode No. 5>

The operation mode No. 5 is a state the wheel loader 100 is traveling accelerating or at a constant speed in the low speed range and the lift arm 111 is moving down. At this time, the controller 41 makes the hydraulic clutch 15 "ON" and the mechanical clutch 18 "OFF".

Because this operation mode is a state the relation between pressure Pacc and pressure Plf detected by the third pressure detector 63 (namely the pressure of the hydraulic oil returned from the lift cylinder 24) satisfies "Pacc≥Plf", respective solenoid valves 31, 32, 33, 34 are maintained at the closed state, and the hydraulic oil from the lift cylinder 24 is returned to the hydraulic oil tank 50 through the control valve 20. Thus, when pressure Plf is equal to or lower than pressure Pacc, because the hydraulic oil cannot be accumulated in the accumulator 30, the hydraulic oil is recovered to the hydraulic oil tank 50 as it is.

<Operation Mode No. 6 (Refer to FIG. 12)>

The operation mode No. 6 is a state the wheel loader 100 is traveling accelerating or at a constant speed in the low speed range and the lift arm 111 is moving down. At this time, the controller 41 makes the hydraulic clutch 15 "ON" and the mechanical clutch 18 "OFF".

Figure 12:
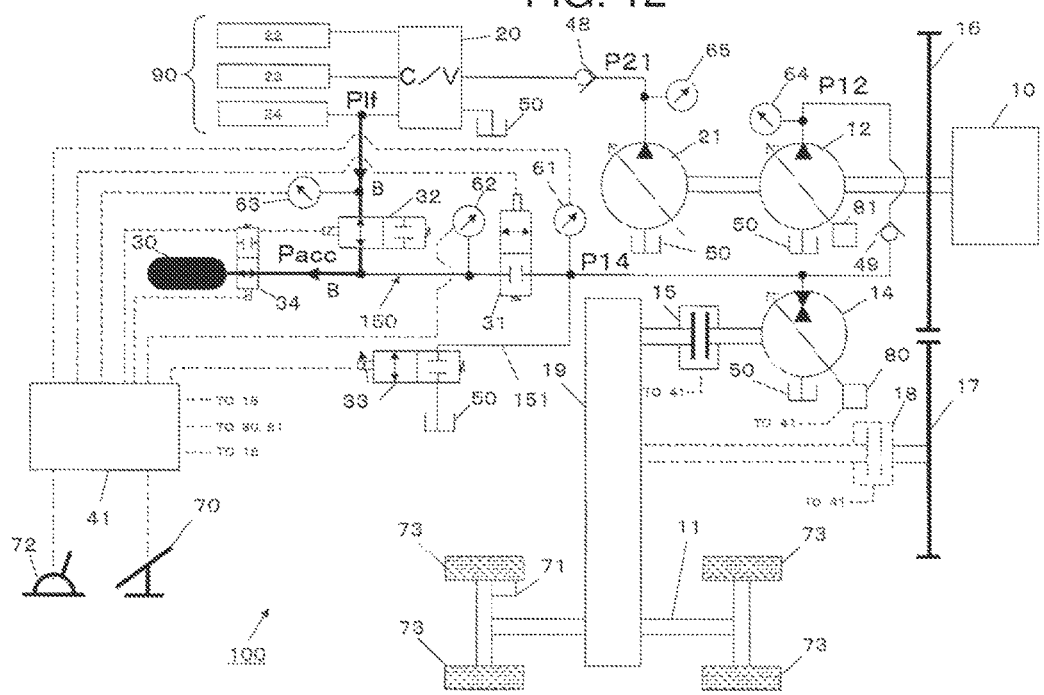
FIG. 12 is a drawing showing the flow of the hydraulic oil in the operation mode No. 6.

Because this operation mode is a state the relation between pressure Pacc and pressure Plf satisfies "Pacc<Plf", the controller 41 switches the second solenoid valve 32 and the fourth solenoid valve 34 to "open". At this time, the first solenoid valve 31 is "close", and the third solenoid valve 33 is "close". Then, as shown in FIG. 12, the hydraulic oil flows to the direction of arrow B inside the branching flow path 150 by the pressure difference, and is accumulated in the accumulator 30. Thus, the energy generated at the time of the moving-down motion of the lift arm 111 can be stored in the accumulator 30 as the regenerative energy. Also, in FIG. 12, the accumulator 30 illustrated in black shows that it is in the accumulating state.

<Operation Mode No. 7>

The operation mode No. 7 is a state the wheel loader 100 is traveling accelerating or at a constant speed in the high speed range and the lift arm 111 is moving down. At this time, the controller 41 makes the hydraulic clutch 15 "OFF" and the mechanical clutch 18 "ON".

Because this operation mode is a state the relation between pressure Pacc and pressure Plf detected by the third pressure detector 63 satisfies "Pacc≥Plf", the controller 41 maintains respective solenoid valves 31, 32, 33, 34 at the closed state, and the hydraulic oil from the lift cylinder 24 is returned to the hydraulic oil tank 50 through the control valve 20.

<Operation Mode No. 8>

The operation mode No. 8 is a state the wheel loader 100 is traveling accelerating or at a constant speed in the high speed range and the lift arm 111 is moving down. At this time, the controller 41 makes the hydraulic clutch 15 "OFF" and the mechanical clutch 18 "ON".

Because this operation mode is a state the relation between pressure Pacc and pressure Plf satisfies "Pacc<Plf", the controller 41 switches the second solenoid valve 32 and the fourth solenoid valve 34 to "open". At this time, the first solenoid valve 31 is "close", and the third solenoid valve 33 is "close". Then, the hydraulic oil flows from the lift cylinder 24 to the accumulator 30 by pressure difference, and is accumulated by the accumulator 30. Thus, the energy generated at the time of the moving-down motion of the lift arm 111 can be stored in the accumulator 30 as the regenerative energy.

<Operation Mode No. 9>

The operation mode No. 9 is a state the wheel loader 100 is traveling decelerating and the lift arm 111 is moving down. Therefore, the controller 41 operates the regulator 80 of the traveling hydraulic pump-motor 14, and activates the traveling hydraulic pump-motor 14 as a pump by rotation of the propeller shaft 11. At this time, the controller 41 makes the hydraulic clutch 15 "ON" and the mechanical clutch 18 "OFF".

This operation mode is a state the relation between pressure P14, pressure Pacc and pressure Plf satisfies "P14≥Pacc>Plf". Therefore, the first solenoid valve 31 is switched to "open", the fourth solenoid valve 34 is switched to "open", and the hydraulic oil from the traveling hydraulic pump-motor 14 is accumulated in the accumulator 30. At this time, the second solenoid valve 32 and the third solenoid valve 33 are "close". Thus, in this operation mode, the discharge pressure P14 of the traveling hydraulic pump-motor 14 is equal to or higher than pressure Pacc of the inside of the accumulator 30, pressure Plf of the hydraulic oil returning from the lift cylinder 24 is lower than pressure Pacc of the inside of the accumulator 30, and therefore it is configured that the hydraulic oil from the traveling hydraulic pump-motor 14 is introduced to the accumulator 30 and the energy generated at the time of deceleration is stored in the accumulator 30 as the regenerative energy.

<Operation Mode No. 10>

The operation mode No. 10 is a state the wheel loader 100 is traveling decelerating and the lift arm 111 is moving down. Therefore, the controller 41 operates the regulator 80 of the traveling hydraulic pump-motor 14, and activates the traveling hydraulic pump-motor 14 as a pump by rotation of the propeller shaft 11. At this time, the controller 41 makes the hydraulic clutch 15 "ON" and the mechanical clutch 18 "OFF".

This operation mode is a state the relation between pressure P14, pressure Pacc and pressure Plf satisfies "P14<Pacc≤Plf". Therefore, the second solenoid valve 32 is switched to "open", the fourth solenoid valve 34 is switched to "open", and the hydraulic oil returning from the lift cylinder 24 is accumulated in the accumulator 30. At this time, the first solenoid valve 31 and the third solenoid valve 33 are "close". Thus, in this operation mode, pressure Plf of the hydraulic oil returning from the lift cylinder 24 is equal to or higher than pressure Pacc of the inside of the accumulator 30, the discharge pressure P14 of the traveling hydraulic pump-motor 14 is lower than pressure Pacc of the inside of the accumulator 30, and therefore it is configured that the hydraulic oil from the lift cylinder 24 is introduced to the accumulator 30 and the energy generated at the time of the moving-down motion of the lift arm 111 is stored in the accumulator 30 as the regenerative energy.

<Operation Mode No. 11 (Refer to FIG. 13)>

The operation mode No. 11 is a state the wheel loader 100 is traveling decelerating and the lift arm 111 is moving up. Therefore, the controller 41 operates the regulator 80 of the traveling hydraulic pump-motor 14, and activates the traveling hydraulic pump-motor 14 as a pump by rotation of the propeller shaft 11. At this time, the controller 41 makes the hydraulic clutch 15 "ON" and the mechanical clutch 18 "OFF". In other words, this operation mode is a state the work is executed while applying a load to the lift arm 111 during deceleration.

Figure 13:
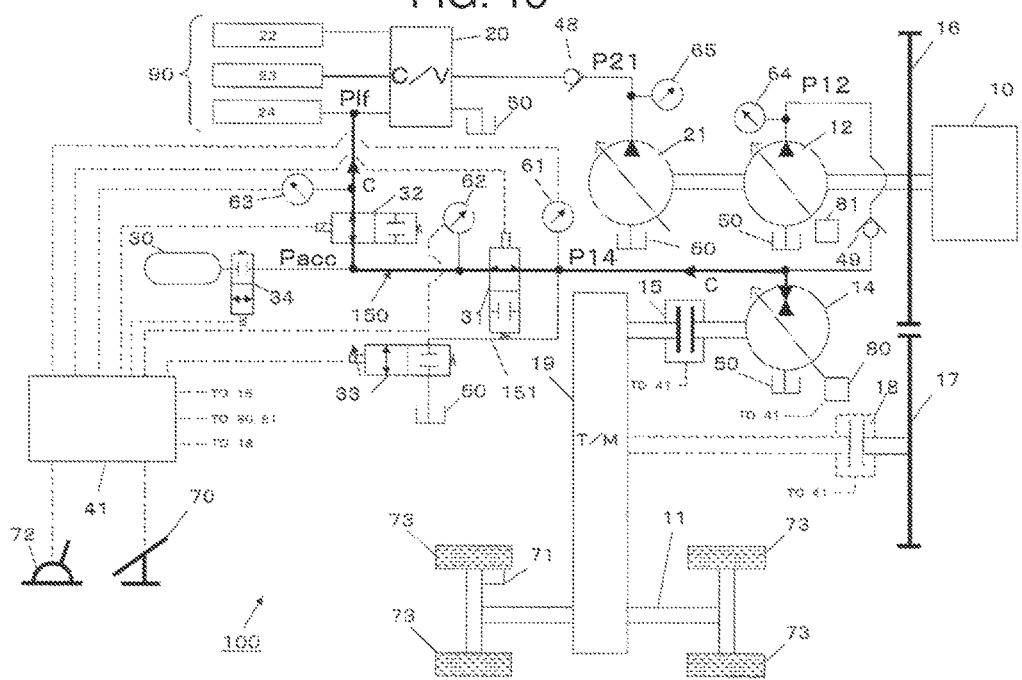
FIG. 13 is a drawing showing the flow of the hydraulic oil in the operation mode No. 11.

This operation mode is a state the relation of the pressure between pressure P14 and pressure Plf satisfies "P14≥Plf", and therefore the controller 41 switches the first solenoid valve 31 to "open" and the second solenoid valve 32 to "open" and makes the hydraulic oil from the traveling hydraulic pump-motor 14 flow to C-direction as shown in FIG. 13 to be introduced to the lift cylinder 24. At this time, the third solenoid valve 33 and the fourth solenoid valve 34 are "close".

The lift cylinder 24 can execute the moving-up motion of the lift arm 111 not only by the hydraulic oil fed from the front operation hydraulic pump 21 but also being assisted by the hydraulic oil from the traveling hydraulic pump-motor 14. Thus, in the operation mode No. 11, by utilizing the energy generated at the time of deceleration of the vehicle for the moving-up motion of the lift arm 111, the loss of the energy is eliminated, and the fuel efficiency is improved.

<Operation Mode No. 12>

The operation mode No. 12 is a state the wheel loader 100 is traveling decelerating and the lift arm 111 is moving up. Therefore, the controller 41 operates the regulator 80 of the traveling hydraulic pump-motor 14, and activates the traveling hydraulic pump-motor 14 as a pump by rotation of the propeller shaft 11. At this time, the controller 41 makes the hydraulic clutch 15 "ON" and the mechanical clutch 18 "OFF". In other words, this operation mode is a state the work is executed while applying a load to the lift arm 111 during deceleration.

In this operation mode, because the relation of the pressure between pressure P14 and pressure Plf is in the state of satisfying "P14<Plf", the hydraulic oil from the traveling hydraulic pump-motor 14 cannot be used for assisting the moving-up motion of the lift arm 111. Therefore, the controller 41 maintains the solenoid valves 31, 32, 33, 34 at the closed state.

<Operation Mode No. 13>

The operation mode No. 13 is a state the wheel loader 100 is traveling accelerating or at a constant speed in the low speed range and the lift arm 111 is moving down. In this state, the controller 41 makes the hydraulic clutch 15 "ON" and the mechanical clutch 18 "OFF", activates the traveling hydraulic pump-motor 14 as a motor, and makes the vehicle travel.

This operation mode is a state the relation between pressure P14 and pressure Plf satisfies "P14≥Plf". Accordingly, the hydraulic oil from the lift cylinder 24 cannot assist the motor motion of the traveling hydraulic pump-motor 14. Therefore, the controller 41 maintains the solenoid valves 31, 32, 33, 34 at the closed state.

<Operation Mode No. 14 (Refer to FIG. 14)>

The operation mode No. 14 is a state the wheel loader 100 is traveling accelerating or at a constant speed in the low speed range and the lift arm 111 is moving down. In this state, the controller 41 makes the hydraulic clutch 15 "ON" and the mechanical clutch 18 "OFF", activates the traveling hydraulic pump-motor 14 as a motor, and makes the vehicle travel.

Figure 14:
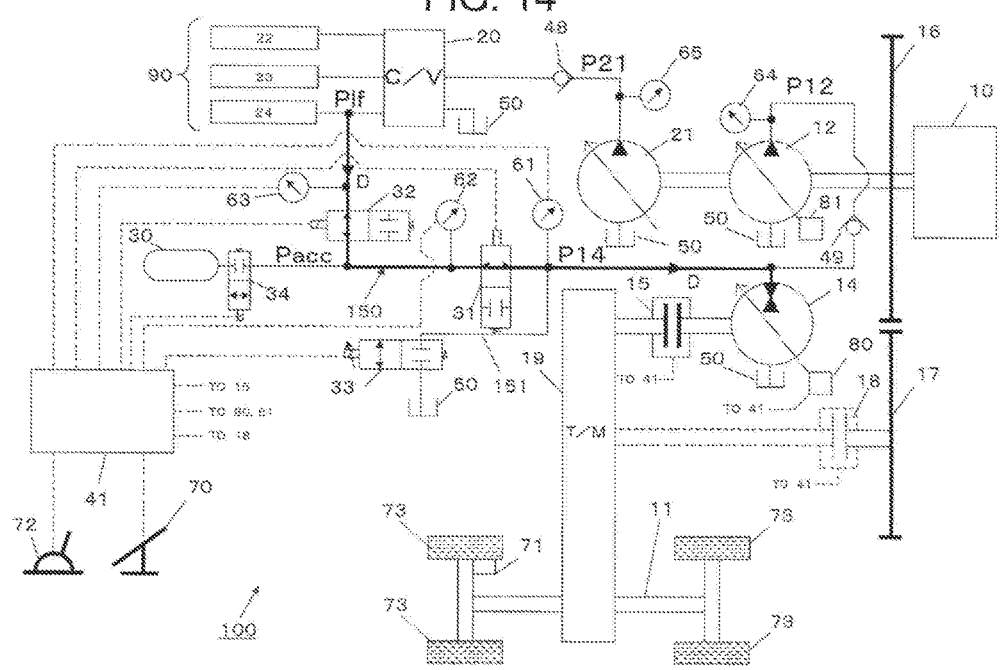
FIG. 14 is a drawing showing the flow of the hydraulic oil in the operation mode No. 14.
Figure 15:
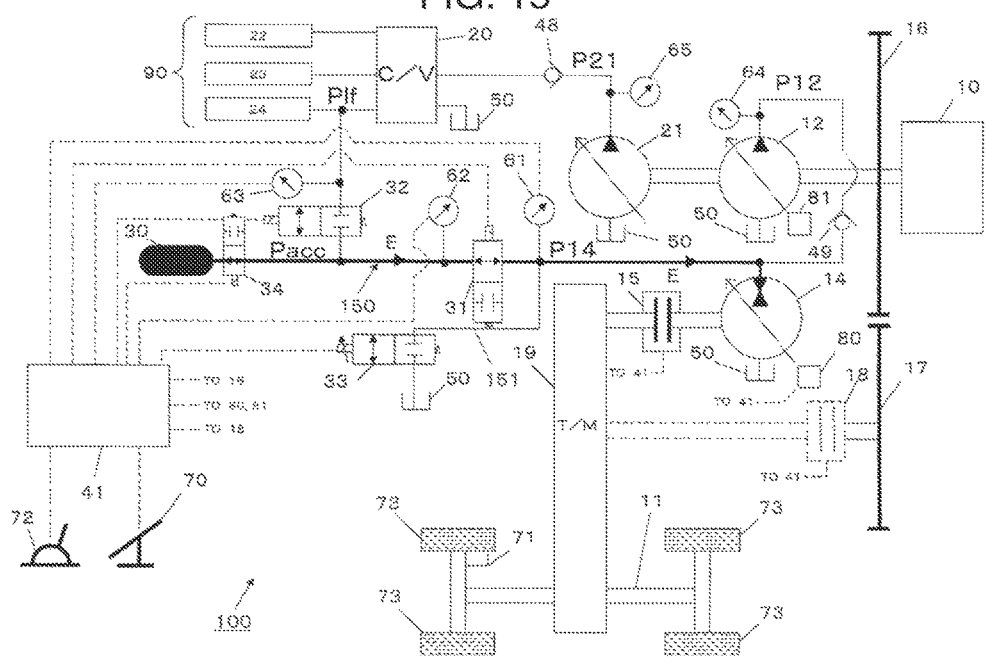
FIG. 15 is a drawing showing the flow of the hydraulic oil in the operation mode No. 17.

This operation mode is a state the relation between pressure P14 and pressure Plf satisfies "P14<Plf". Therefore, the controller 41 switches the first solenoid valve 31 and the second solenoid valve 32 to "open". At this time, the first solenoid valve 31 is "close" and the third solenoid valve 33 is "close". Then, as shown in FIG. 14, the hydraulic oil flows to the direction of arrow D inside the branching flow path 150 by pressure difference, and assists the motor motion of the traveling hydraulic pump-motor 14.

In other words, the traveling hydraulic pump-motor 14 can rotationally drive the wheels 73 not only by the hydraulic oil fed from the traveling hydraulic pump 12 but also being assisted by the hydraulic oil from the lift cylinder 23. Thus, in the operation mode No. 14, by utilizing the energy generated at the time of the moving-down motion of the lift arm 111 for rotational driving of the wheels 73, the loss of the energy is eliminated, and the fuel efficiency is improved.

<Operation Mode No. 15>

The operation mode No. 15 is a state the wheel loader 100 is traveling accelerating or at a constant speed in the high speed range and the lift arm 111 is moving down. In this state, the controller 41 makes the hydraulic clutch 15 "OFF" and the mechanical clutch 18 "ON", and rotationally drives the wheels 73 by the power mechanically transmitted from the engine 10.

This operation mode is a state the relation between pressure P14 and pressure Plf satisfies "P14≥Plf", and therefore the hydraulic oil from the lift cylinder 24 cannot be fed to the traveling hydraulic pump-motor 14. Accordingly, the controller 41 maintains the solenoid valves 31, 32, 33, 34 at the closed state. In other words, the wheels 73 are rotationally driven by the power transmitted through the first gear 16 and the second gear 17 connected to the engine 10.

<Operation Mode No. 16>

The operation mode No. 16 is a state the wheel loader 100 is traveling accelerating or at a constant speed in the high speed range and the lift arm 111 is moving down. At this time, the controller 41 makes the hydraulic clutch 15 "ON" and the mechanical clutch 18 "OFF".

This operation mode is a state the relation between pressure P14 and pressure Plf satisfies "P14<Plf", and therefore the controller 41 switches the first solenoid valve 31 and the second solenoid valve 32 to "open". At this time, the third solenoid valve 33 is "close", and the fourth solenoid valve 34 is "close". Then, the hydraulic oil flows from the lift cylinder 24 toward the traveling hydraulic pump-motor 14 inside the branching flow path 150 by pressure difference, and assists the motor motion of the traveling hydraulic pump-motor 14.

Thus, in the operation mode No. 16, even when the vehicle travels at the high speed range, the energy generated by the moving-down motion of the lift arm 111 can be utilized for rotational driving of the wheels 73, therefore the loss of the energy is eliminated, and the fuel efficiency improves.

Next, the operation mode for utilizing (regenerating) the regenerative energy stored in the accumulator 30 will be explained.

<Operation Mode No. 17 (Refer to FIG. 15)>

The operation mode No. 17 is a state the wheel loader 100 is traveling accelerating or at a constant speed in the low speed range and the lift motion stops. At this time, the controller 41 makes the hydraulic clutch 15 "ON" and the mechanical clutch 18 "OFF", executes a motor motion of the traveling hydraulic pump-motor 14, and makes the vehicle travel.

This operation mode is a state the relation between pressure Pacc and pressure P12 detected by the fourth pressure detector 64 (namely the pressure of the hydraulic oil discharged from the traveling hydraulic pump 12) satisfies "Pacc≥P12", and therefore the first solenoid valve 31 and the fourth solenoid valve 34 are switched to "open". At this time, the second solenoid valve 32 and the third solenoid valve 33 are "close". Then, the hydraulic oil accumulated in the accumulator 30 flows to arrow E direction of FIG. 15 inside the branching flow path 150 by pressure difference, and is fed to the traveling hydraulic pump-motor 14.

Thus, the traveling hydraulic pump-motor 14 rotationally drives the wheels 73 assisted by the pressure of the hydraulic oil accumulated in the accumulator 30. In other words, in the operation mode No. 17, the vehicle is made travel utilizing the energy (regenerative power) regenerated and stored in the accumulator 30.

<Operation Mode No. 18>

The operation mode No. 18 is a state the wheel loader 100 is traveling accelerating or at a constant speed in the low speed range and the lift motion stops. In this state, the controller 41 makes the hydraulic clutch 15 "ON" and the mechanical clutch 18 "OFF", executes a motor motion of the traveling hydraulic pump-motor 14, and makes the vehicle travel.

This operation mode is a state the relation between pressure Pacc and pressure P12 satisfies "Pacc<P12", and therefore the hydraulic oil stored in the accumulator 30 cannot be fed to the traveling hydraulic pump-motor 14. Accordingly, the controller 41 maintains respective solenoid valves 31, 32, 33, 34 closed, and makes the vehicle travel by the traveling hydraulic pump-motor 14 without receiving assistance from the accumulator 30.

<Operation Mode No. 19>

The operation mode No. 19 is a state the wheel loader 100 is traveling accelerating or at a constant speed in the high speed range and the lift motion stops. In this state, because the relation between pressure Pacc and pressure P12 satisfies "Pacc≥P12", the controller 41 makes the hydraulic clutch 15 "ON" and the mechanical clutch 18 "OFF", executes a motor motion of the traveling hydraulic pump-motor 14, and makes the vehicle travel.

Also, the controller 41 switches the first solenoid valve 31 and the fourth solenoid valve 34 to "open". At this time, the second solenoid valve 32 and the third solenoid valve 33 are "close". Then, the hydraulic oil accumulated in the accumulator 30 flows toward the traveling hydraulic pump-motor 14 inside the branching flow path 150 by pressure difference, and is fed to the traveling hydraulic pump-motor 14. Thus, the traveling hydraulic pump-motor 14 rotationally drives the wheels 73 assisted by the pressure of the hydraulic oil stored in the accumulator 30. In other words, in the operation mode No. 19, even when the vehicle travels at the highspeed range, the vehicle is made travel utilizing the energy (regenerative power) regenerated and stored in the accumulator 30.

<Operation Mode No. 20>

The operation mode No. 20 is a state the wheel loader 100 is traveling accelerating or at a constant speed in the high speed range and the lift motion stops. This operation mode is a state the relation between pressure Pacc and pressure P12 satisfies "Pacc<P12", and therefore the hydraulic oil cannot be fed to the traveling hydraulic pump-motor 14 from the accumulator 30. Accordingly, the controller 41 maintains the solenoid valves 31, 32, 33, 34 at the closed state, makes the hydraulic clutch 15 "OFF" and the mechanical clutch 18 "ON", and makes the vehicle travel by the power mechanically transmitted from the engine 10.

<Operation Mode No. 21 (Refer to FIG. 16)>

The operation mode No. 21 is a state the wheel loader 100 is traveling at the low speed range and the lift arm 111 is moving up. At this time, the controller 41 makes the hydraulic clutch 15 "ON" and the mechanical clutch 18 "OFF", executes a motor motion of the traveling hydraulic pump-motor 14, and makes the vehicle travel.

Figure 16:
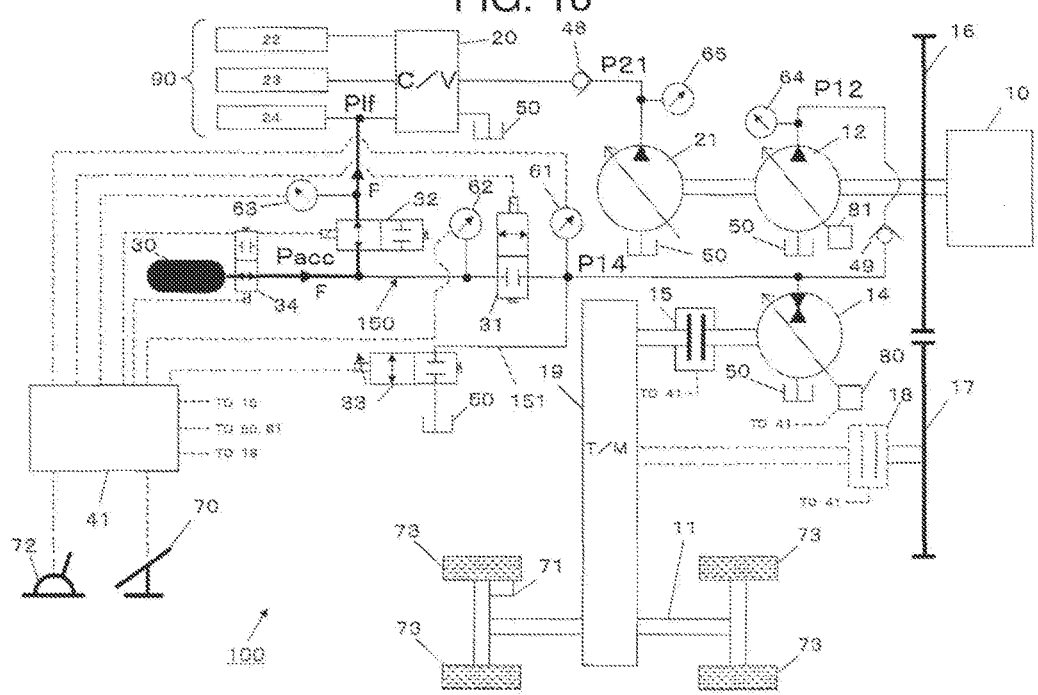
FIG. 16 is a drawing showing the flow of the hydraulic oil in the operation mode No. 21.

This operation mode is a state the relation between pressure Pacc and pressure P21 detected by the fifth pressure detector 65 (namely the pressure of the hydraulic oil discharged from the front operation hydraulic pump 21) satisfies "Pacc≥P21", and therefore the controller 41 switches the second solenoid valve 32 and the fourth solenoid valve 34 to "open". At this time, the first solenoid valve 31 and the third solenoid valve 33 are "close". Then, as shown in FIG. 16, the hydraulic oil accumulated in the accumulator 30 flows to arrow F direction of FIG. 16 inside the branching flow path 150 by pressure difference, and is fed to the lift cylinder 24.

The lift cylinder 24 makes the lift arm 111 do the moving-up motion assisted by the pressure of the hydraulic oil accumulated in the accumulator 30. In other words, in the operation mode No. 21, the energy (regenerative power) regenerated and stored in the accumulator 30 is utilized for the moving-up motion of the lift arm 111.

<Operation Mode No. 22>

The operation mode No. 22 is a state the wheel loader 100 is traveling at the low speed range and the lift arm 111 is moving up. In this state, the controller 41 makes the hydraulic clutch 15 "ON" and the mechanical clutch 18 "OFF", executes a motor motion of the traveling hydraulic pump-motor 14, and makes the vehicle travel.

This operation mode is a state the relation between pressure Pacc and pressure P21 satisfies "Pacc<P21", and therefore the hydraulic oil accumulated in the accumulator 30 cannot be fed to the lift cylinder 24. Accordingly, the controller 41 maintains respective solenoid valves 31, 32, 33, 34 closed, and executes the moving-up motion of the lift arm 111 without being assisted by the accumulator 30.

<Operation Mode No. 23>

The operation mode No. 23 is a state the wheel loader 100 is traveling at the high speed range and the lift arm 111 is moving up. In this state, the controller 41 makes the hydraulic clutch 15 "OFF" and the mechanical clutch 18 "ON", and makes the vehicle travel by the power mechanically transmitted from the engine 10.

This operation mode is a state the relation between pressure Pacc and pressure P21 satisfies "Pacc≥P21", and therefore the controller 41 switches the second solenoid valve 32 and the fourth solenoid valve 34 to "open". At this time, the first solenoid valve 31 and the third solenoid valve 33 are "close". Then the hydraulic oil accumulated in the accumulator 30 flows toward the lift cylinder 24 by pressure difference, and is fed to the lift cylinder 24.

The lift cylinder 24 executes the moving-up motion of the lift arm 111 assisted by the pressure of the hydraulic oil stored in the accumulator 30. In other words, in the operation mode No. 23, the energy (regenerative energy) regenerated and stored in the accumulator 30 is utilized for the moving-up motion of the lift arm 111.

<Operation Mode No. 24>

The operation mode No. 24 is a state the wheel loader 100 is traveling at the high speed range and the lift arm 111 is moving up. In this state, the controller 41 makes the hydraulic clutch 15 "OFF" and the mechanical clutch 18 "ON", and makes the vehicle travel by the power mechanically transmitted from the engine 10.

This operation mode is a state the relation between pressure Pacc and pressure P21 satisfies "Pacc<P21", and therefore the hydraulic oil stored in the accumulator 30 cannot be fed to the lift cylinder 24. Accordingly, the controller 41 maintains respective solenoid valves 31, 32, 33, 34 closed, and executes the moving-up motion of the lift arm 111 without being assisted by the accumulator 30.

Figure 17:
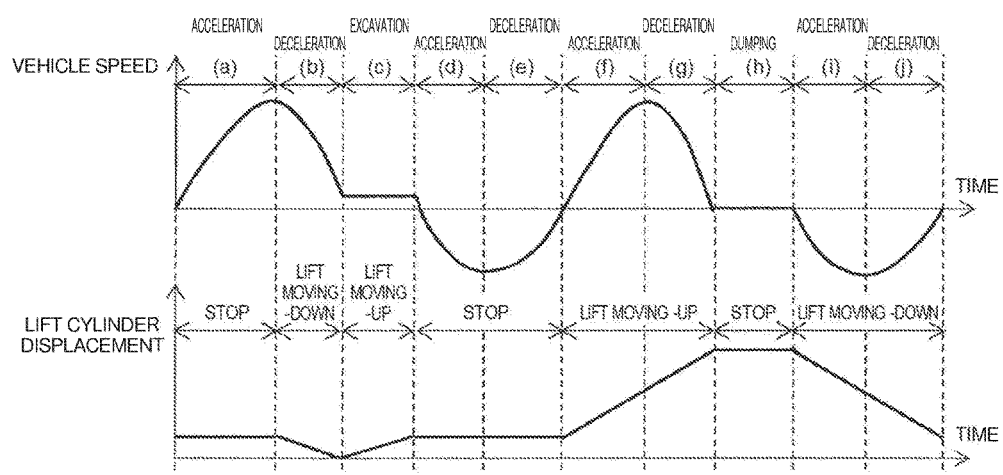
FIG. 17 is a drawing showing the transition of the opening and closing state of each solenoid valve in a case the wheel loader related to the first embodiment executes a V-shape excavation motion.

FIG. 17 is a drawing showing the transition of the opening/closing state of respective solenoid valves when the wheel loader related to the first embodiment executes the V-shape excavation motion which is a series of motion from excavation to dumping. As shown in FIG. 17, when the V-shape excavation motion is executed, as the time elapses, the motion proceeds in the order from the work (a) to (j). In other words, the state of the vehicle changes in such a way of drawing a V-shape in the order of (a) acceleration (forward) from the initial position toward the excavation location→(b) deceleration (backward)→(c) excavation→(d) acceleration (backward) toward the initial position→(e) deceleration (backward)→(f) acceleration (forward) toward the dumping location→(g) deceleration (forward)→(h) dumping→(i) acceleration (backward) toward the initial position→(j) deceleration (backward). In the V-shape excavation motion, change of the vehicle state is repeated in this order.

In a series of the V-shape excavation motion, as the time elapses, the lift arm 111 acts in the order of stop→lift moving down→lift moving up→stop→lift moving up→stop→lift moving down. At this time, in each work of (a) to (j), the controller 41 selects the operation mode according to the state of the pressure Plf, P14, Pacc, P12, and P21. Thus, the excess portion of the energy is regenerated in the accumulator 30, the regenerative energy is reproduced according to the works, and thereby the energy can be utilized effectively. This fact leads also to improvement of the fuel efficiency.

As described above, according to the wheel loader 100 related to the first embodiment, the energy generated at the time of the moving-down motion of the lift arm 111 can be stored in the accumulator 30 as the regenerative energy, and assistance of the moving-up motion of the lift arm 111 or assistance of the rotational drive of the wheels 73 can be executed utilizing the regenerative energy. Also, the energy generated at the time of deceleration of the vehicle can be stored in the accumulator 30 as the regenerative energy, and assistance of the moving-up motion of the lift arm 111 or assistance of the rotational drive of the wheels 73 can be executed utilizing the regenerative energy. As a result, the loss of the energy can be suppressed, and great contribution is effected also to improvement of the fuel efficiency.

Second Embodiment

Figure 18:
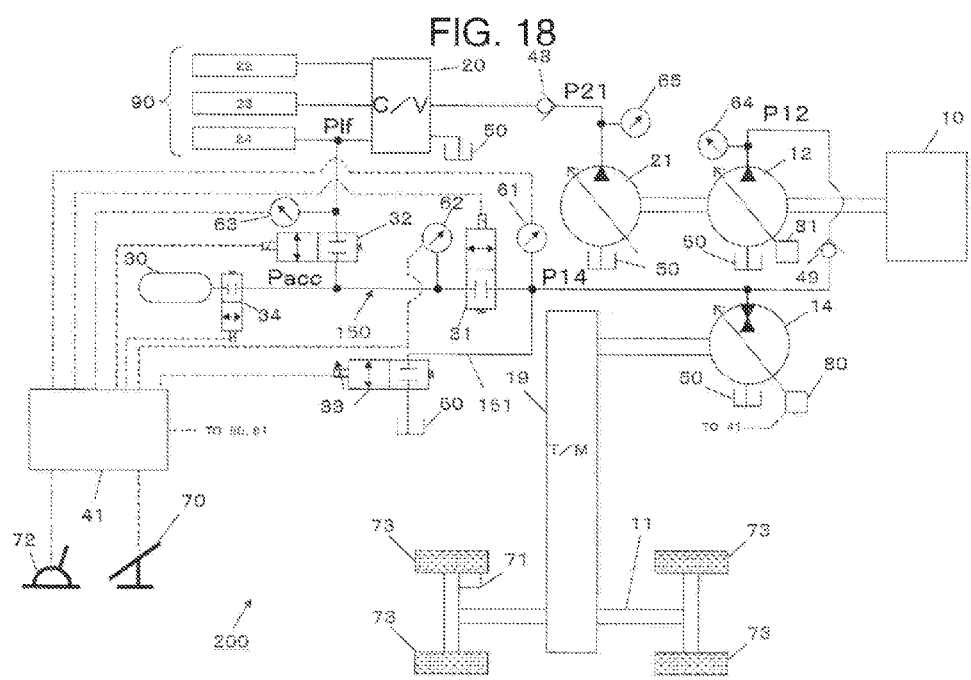
FIG. 18 is an overall block diagram of a wheel loader related to the second embodiment of the present invention.

Although a wheel loader 200 related to the second embodiment will be explained below, the portion duplicating with the embodiment described above will be marked with a same reference sign, and explanation thereof will be omitted. FIG. 18 is an overall block diagram of the wheel loader related to the second embodiment of the present invention. As is clear comparing FIG. 1 and FIG. 18, the wheel loader 200 related to the second embodiment differs from the wheel loader 100 related to the first embodiment in terms that the mechanism for mechanically transmitting the power from the engine 10 to the wheels 73 is not arranged. To be more specific, the wheel loader 200 related to the second embodiment does not include the first gear 16, the second gear 17, the hydraulic clutch 15, and the mechanical clutch 17. In other words, the wheel loader 200 travels only by hydraulic drive.

FIG. 19 tabularizes the motion of the solenoid valves 31-34 of each operation mode of the wheel loader 200. As shown in FIG. 19, the wheel loader 200 has the operation modes No. 31 to 45. Here, the operation mode No. 31 corresponds to the operation mode No. 1, the operation mode No. 32 corresponds to the operation mode No. 3, the operation mode No. 33 corresponds to the operation mode No. 4, the operation mode No. 34 corresponds to the operation mode No. 5, the operation mode No. 35 corresponds to the operation mode No. 6, the operation mode No. 36 corresponds to the operation mode No. 9, the operation mode No. 37 corresponds to the operation mode No. 10, the operation mode No. 38 corresponds to the operation mode No. 11, the operation mode No. 39 corresponds to the operation mode No. 12, the operation mode No. 40 corresponds to the operation mode No. 13, and the operation mode No. 41 corresponds to the operation mode No. 14.

Also, the operation mode No. 42 corresponds to the operation mode No. 17, the operation mode No. 43 corresponds to the operation mode No. 18, the operation mode No. 44 corresponds to the operation mode No. 21, and the operation mode No. 45 corresponds to the operation mode No. 22.

In the wheel loader 200 related to the second embodiment also, similarly to the first embodiment, the energy generated at the time of deceleration of the vehicle and the energy generated at the time of the moving-down motion of the lift arm 111 can be regenerated in the accumulator 30, and assistance of the moving-up motion of the lift arm 111 or assistance of the rotational drive of the wheels 73 can be executed utilizing the regenerative energy. As a result, the loss of the energy can be suppressed, and great contribution is effected also to improvement of the fuel efficiency.

Third Embodiment

Figure 20:
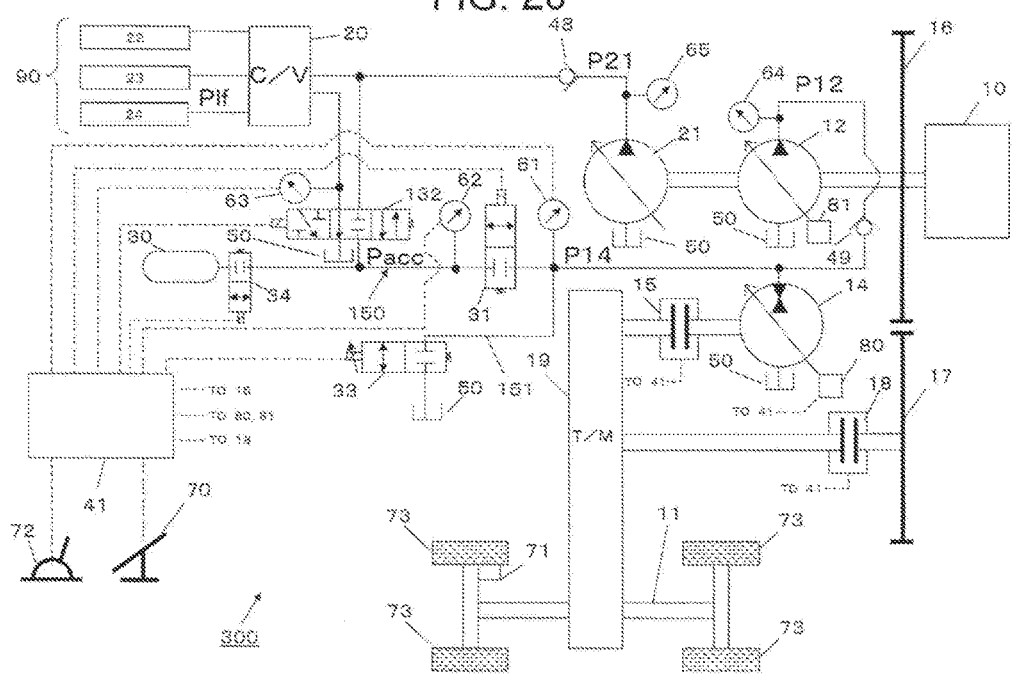
FIG. 20 is an overall block diagram of a wheel loader related to the third embodiment of the present invention.

Although a wheel loader 300 related to the third embodiment will be explained below, the portion duplicating with respective embodiments described above will be marked with a same reference sign, and explanation thereof will be omitted. FIG. 20 is an overall block diagram of the wheel loader related to the third embodiment of the present invention. As shown in FIG. 20, the wheel loader 300 related to the third embodiment differs from the wheel loader 100 related to the first embodiment in terms that the position of the branching flow path 150 on the lift cylinder 24 side is located at a position between the control valve 20 and the front operation hydraulic pump 21. Therefore, an electro-magnetic type switching valve 132 is used instead of the second solenoid valve 32. This electro-magnetic type switching valve 132 is configured to be capable of switching the flow path to 3 directions.

Figure 21:
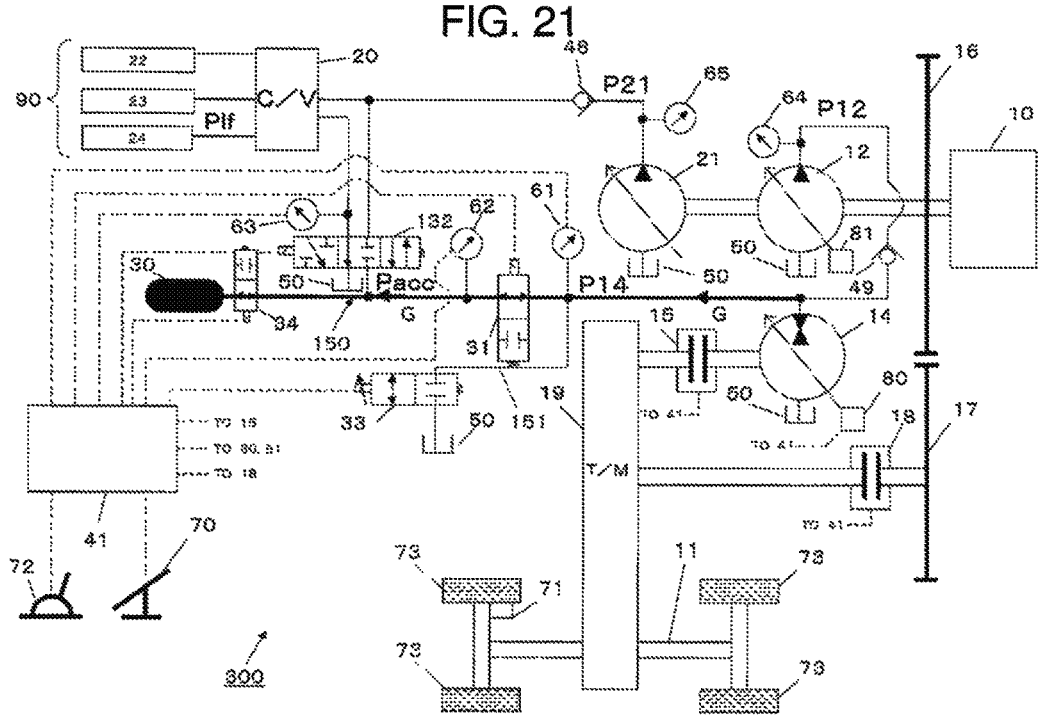
FIG. 21 is a drawing showing the flow of the hydraulic oil in a representative operation mode of the wheel loader related to the third embodiment.
Figure 22:
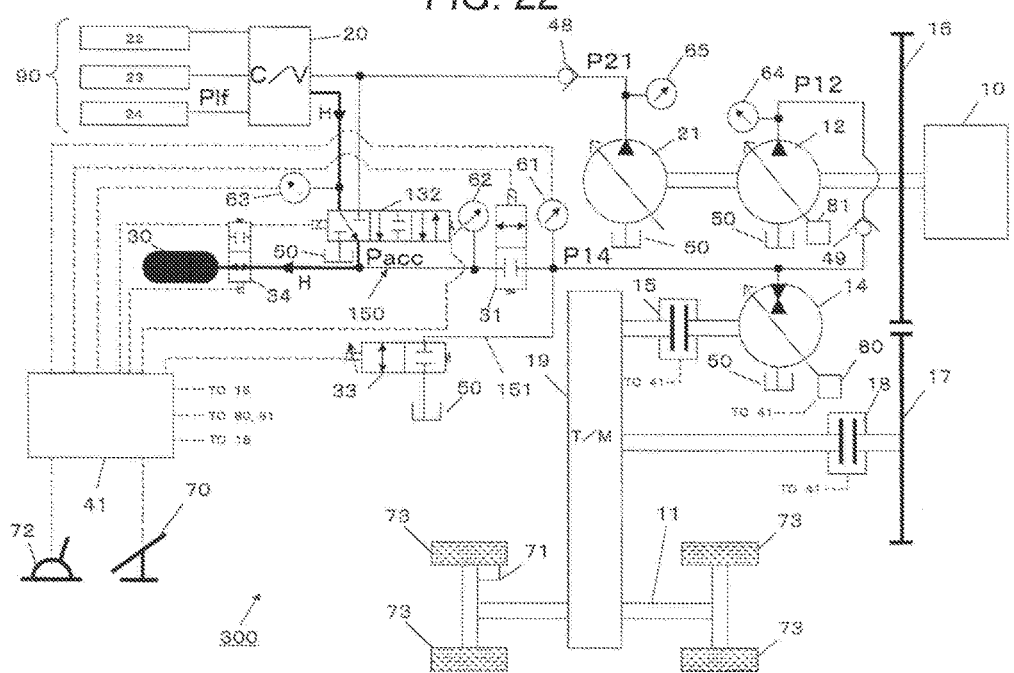
FIG. 22 is a drawing showing the flow of the hydraulic oil in a representative operation mode of the wheel loader related to the third embodiment.
Figure 23:
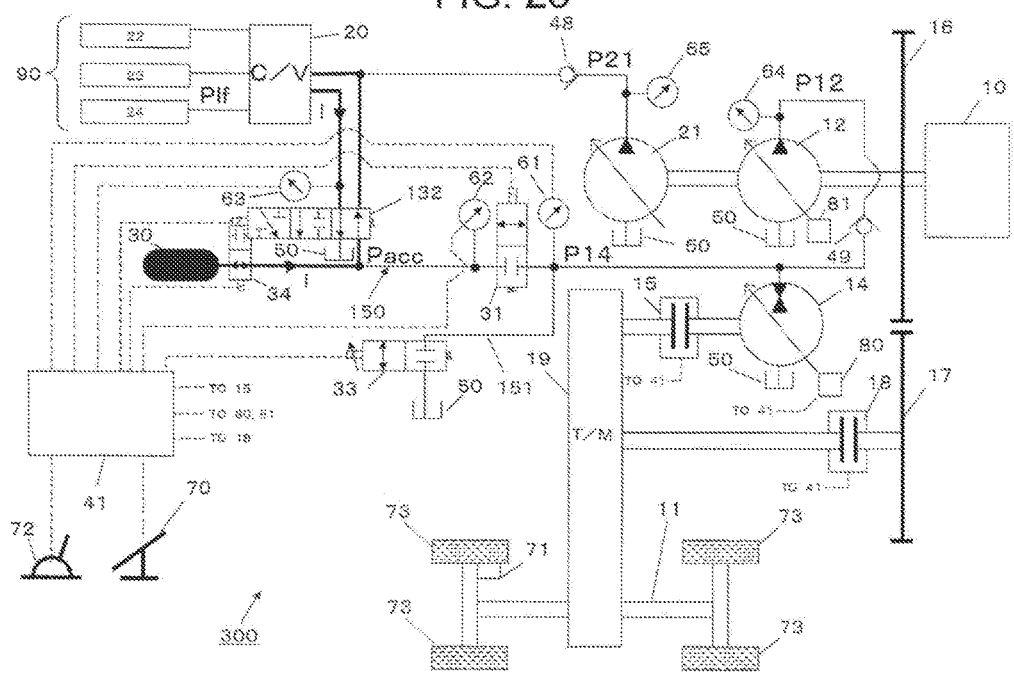
FIG. 23 is a drawing showing the flow of the hydraulic oil in a representative operation mode of the wheel loader related to the third embodiment.

FIG. 21 to FIG. 23 are drawings showing the flow of the hydraulic oil in the representative operation modes of the wheel loader 300 related to the third embodiment. As shown in FIG. 21, at the time of deceleration of the vehicle, when the first solenoid valve 31 and the fourth solenoid valve 34 are opened and the electro-magnetic type switching valve 132 is set to the center position shown in FIG. 21, the hydraulic energy from the traveling hydraulic pump-motor 14 can be stored in the accumulator 30 as the regenerative energy as shown in arrow G in the drawing.

Also, as shown in FIG. 22, during the moving-down motion of the lift arm 111, when the fourth solenoid valve 34 is opened and the electro-magnetic type switching valve 132 is set to the left position shown in FIG. 22, the hydraulic energy generated at the time of the moving-down motion of the lift arm 111 can be stored in the accumulator 30 as the regenerative energy as shown in arrow H in the drawing.

On the other hand, when the regenerative energy stored in the accumulator 30 is reproduced and is used for the moving-up motion of the lift arm 111, as shown in FIG. 23, if the fourth solenoid valve 34 is opened and the electro-magnetic type switching valve 132 is set to the right position, the hydraulic oil stored in the accumulator 30 can be fed to the lift cylinder 23 through the control valve 20 as shown by arrow I in the drawing, and can assist the moving-up motion of the lift arm 111.

Thus, in the wheel loader 300 related to the third embodiment also, similarly to respective embodiments described above, the energy generated at the time of deceleration of the vehicle and the energy generated at the time of the moving-down motion of the lift arm 111 can be regenerated in the accumulator 30, and assistance of the moving-up motion of the lift arm 111 or assistance of the rotational drive of the wheels 73 can be executed utilizing the regenerative energy. As a result, the loss of the energy can be suppressed, and great contribution is effected also to improvement of the fuel efficiency.

Fourth Embodiment

Figure 24:
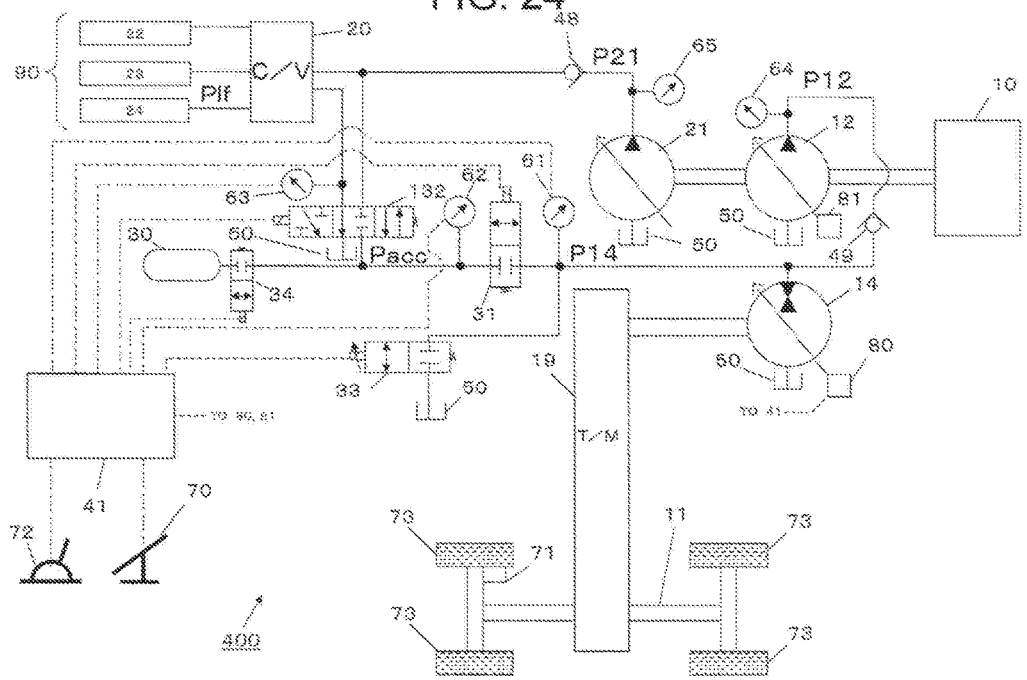
FIG. 24 is an overall block diagram of a wheel loader related to the fourth embodiment of the present invention.

Although a wheel loader 400 related to the fourth embodiment will be explained below, the portion duplicating with respective embodiments described above will be marked with a same reference sign, and explanation thereof will be omitted. FIG. 24 is an overall block diagram of the wheel loader related to the fourth embodiment of the present invention. As shown in FIG. 24, the wheel loader 400 related to the fourth embodiment differs from the wheel loader 300 related to the third embodiment in terms that the mechanism for mechanically transmitting the power from the engine 10 to the wheels 73 is not arranged. To be more specific, the wheel loader 400 related to the fourth embodiment does not include the first gear 16, the second gear 17, the hydraulic clutch 15, and the mechanical clutch 17. In other words, the wheel loader 400 travels only by hydraulic drive.

In the wheel loader 400 related to the fourth embodiment also, similarly to respective embodiments described above, the energy generated at the time of deceleration of the vehicle or at the time of the moving-down motion of the lift arm 111 can be regenerated in the accumulator 30, the regenerative energy can be reproduced and can be converted to the power according to the necessity, therefore the loss of the energy can be suppressed, and the fuel efficiency can be improved.

Fifth Embodiment

Figure 25:
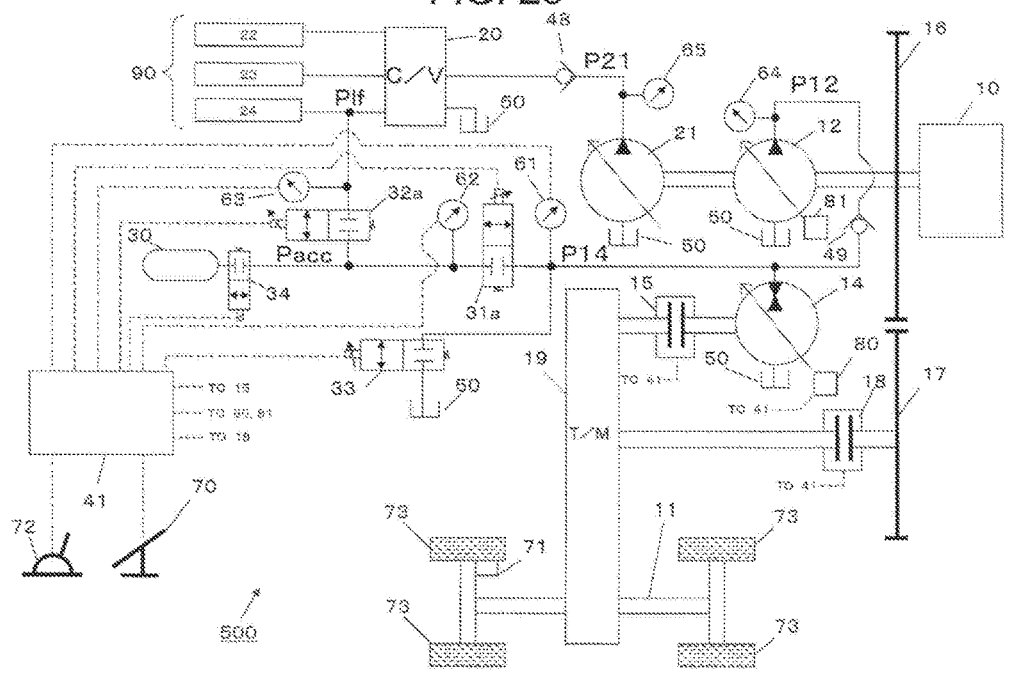
FIG. 25 is an overall block diagram of a wheel loader related to the fifth embodiment of the present invention.

Although a wheel loader 500 related to the fifth embodiment will be explained below, the portion duplicating with respective embodiments described above will be marked with a same reference sign, and explanation thereof will be omitted. FIG. 25 is an overall block diagram of the wheel loader related to the fifth embodiment of the present invention. As shown in FIG. 25, the wheel loader 500 related to the fifth embodiment differs from the first embodiment in the configuration in terms that a first solenoid valve 31a and a second solenoid valve 32a are made the proportional type one. According to the fifth embodiment, because the flow rate can be controlled properly compared to the first embodiment in which the solenoid valves 31, 32 are made the opening/closing valve, the energy loss can be reduced, and the fuel efficiency improves further.

Sixth Embodiment

Figure 26:
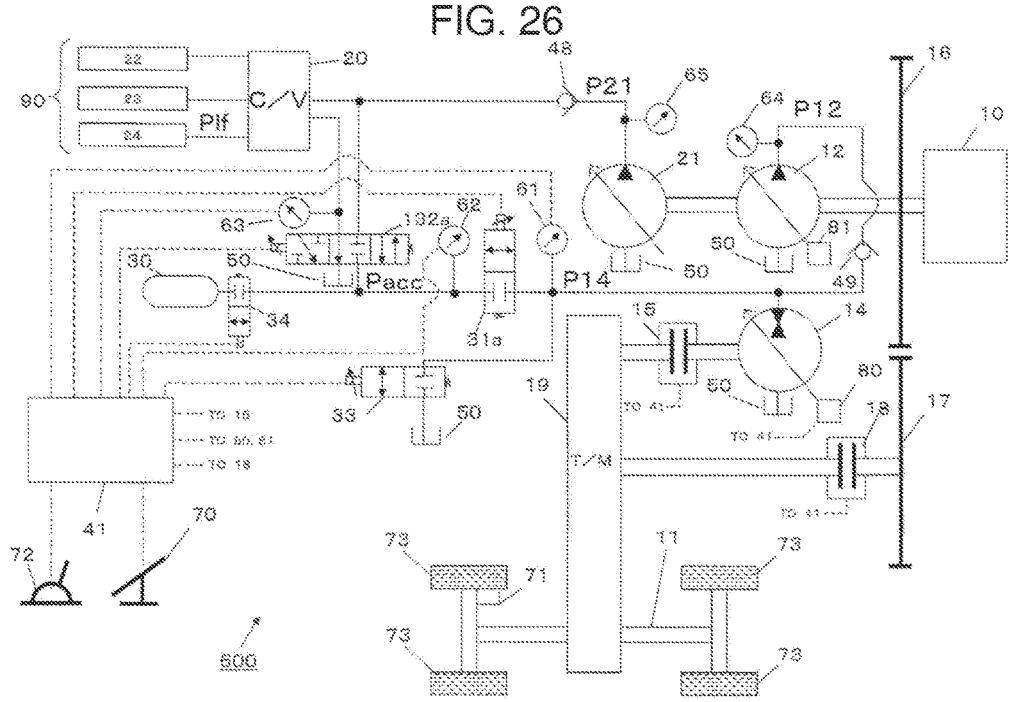
FIG. 26 is an overall block diagram of a wheel loader related to the sixth embodiment of the present invention.

Although a wheel loader 600 related to the sixth embodiment will be explained below, the portion duplicating with respective embodiments described above will be marked with a same reference sign, and explanation thereof will be omitted. FIG. 26 is an overall block diagram of the wheel loader related to the sixth embodiment of the present invention. As shown in FIG. 26, the wheel loader 600 related to the sixth embodiment differs from the third embodiment in the configuration in terms that the first solenoid valve 31a and an electro-magnetic type switching valve 132a are made the proportional type one. According to the sixth embodiment, because the flow rate can be controlled properly compared to the third embodiment in which the first solenoid valve 31 and the electro-magnetic type switching valve 132 are made the opening/closing valve, the energy loss can be reduced, and the fuel efficiency improves further.

Seventh Embodiment

Figure 27:
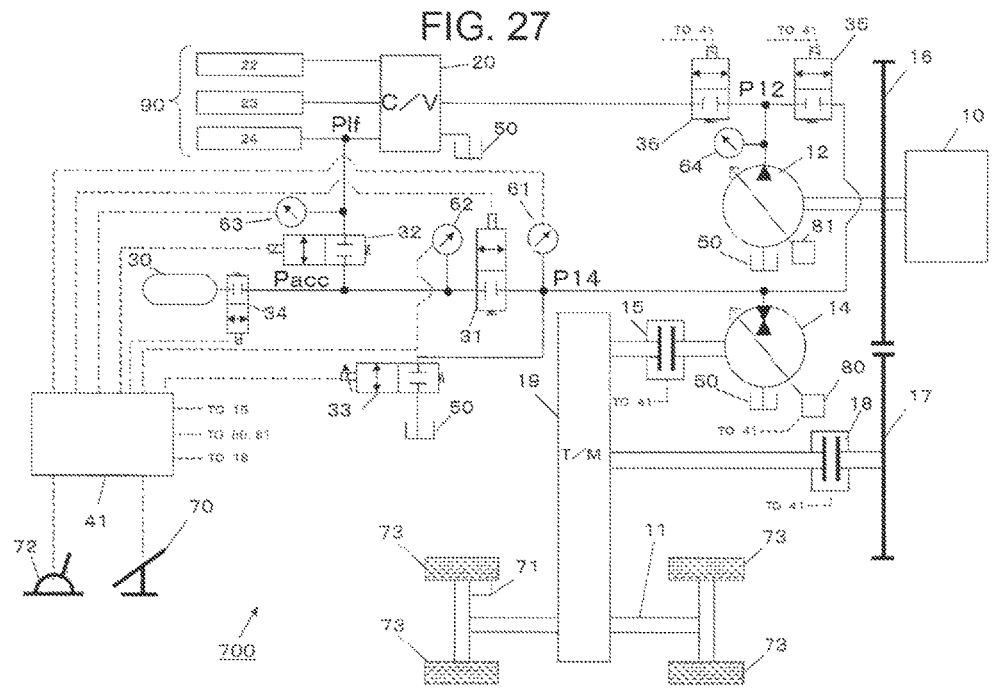
FIG. 27 is an overall block diagram of a wheel loader related to the seventh embodiment of the present invention.

Although a wheel loader 700 related to the seventh embodiment will be explained below, the portion duplicating with respective embodiments described above will be marked with a same reference sign, and explanation thereof will be omitted. FIG. 27 is an overall block diagram of the wheel loader related to the seventh embodiment of the present invention. As is clear comparing FIG. 1 and FIG. 27, the wheel loader 700 related to the seventh embodiment differs from the wheel loader 100 related to the first embodiment in terms that the front operation hydraulic pump 21 is not arranged.

To be more specific, in the wheel loader 700 related to the seventh embodiment, the traveling hydraulic pump 12 has both functions for traveling and for operating the working device 90. Therefore, it is configured to arrange a solenoid valve 35 between the traveling hydraulic pump 12 and the traveling hydraulic pump-motor 14 and to arrange a solenoid valve 36 between the traveling hydraulic pump 12 and the control valve 20. Also, because the controller 41 switches opening/closing of the solenoid valves 35, 36, rotational drive of the wheels 73, the motion of the bucket 112, the bending motion of the vehicle body through the center joint 101, and the moving-up/down motion of the lift arm 111 are executed by one traveling hydraulic pump 12.

In the wheel loader 700 related to the seventh embodiment also, similarly to respective embodiments described above, the energy generated at the time of deceleration of the vehicle or at the time of the moving-down motion of the lift arm 111 can be regenerated in the accumulator 30, the regenerative energy can be reproduced and can be converted to the power according to the necessity, therefore the loss of the energy can be suppressed, and the fuel efficiency can be improved. Also, according to the seventh embodiment, because the number of sets of the hydraulic pump can be reduced, it can also contribute to the cost reduction.

Eighth Embodiment

Figure 28:
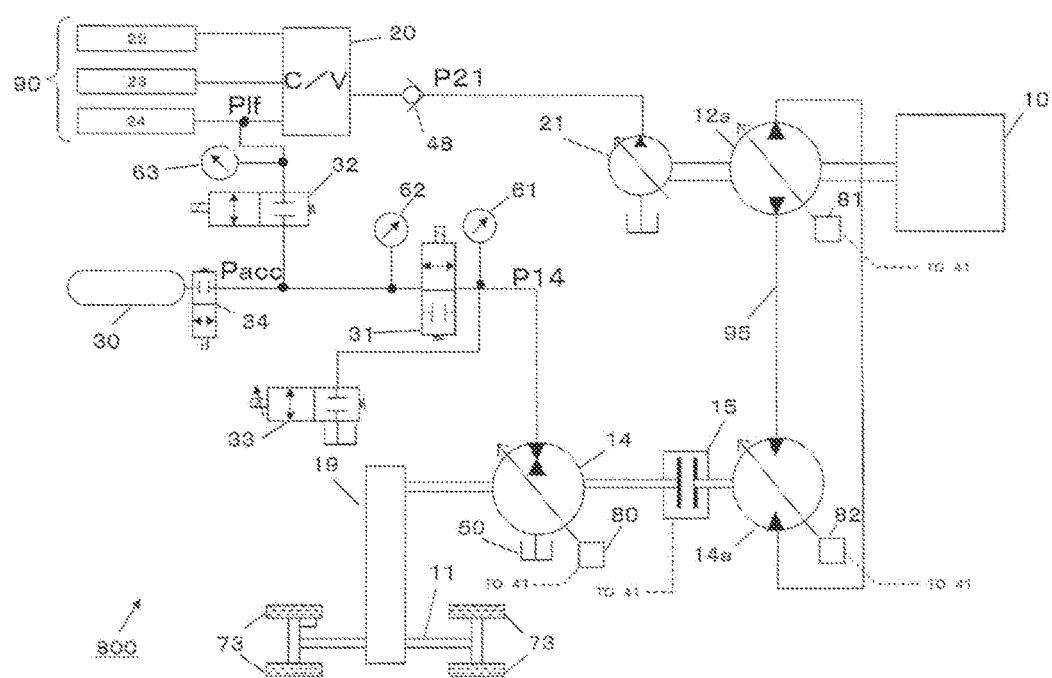
FIG. 28 is an overall block diagram of a wheel loader related to the eighth embodiment of the present invention.

Although a wheel loader 800 related to the eighth embodiment will be explained below, the portion duplicating with respective embodiments described above will be marked with a same reference sign, and explanation thereof will be omitted. FIG. 28 is an overall block diagram of the wheel loader related to the eighth embodiment of the present invention. As shown in FIG. 28, the wheel loader 800 related to the eighth embodiment differs from the first embodiment in terms that a closed circuit 95 formed by connecting a 2-way traveling hydraulic pump 12a and a 2-way traveling hydraulic motor 14a by hydraulic piping in a ring shape is provided, and that the gears 16, 17 and the mechanical clutch 18 are not provided. Also, the reference sign 82 represents a regulator.

In the wheel loader 800 related to the eighth embodiment also, similarly to respective embodiments described above, the energy generated at the time of deceleration of the vehicle or at the time of the moving-down motion of the lift arm 111 can be regenerated in the accumulator 30, the regenerative energy can be reproduced and can be converted to the power according to the necessity, therefore the loss of the energy can be suppressed, and the fuel efficiency can be improved.

Ninth Embodiment

Figure 29:
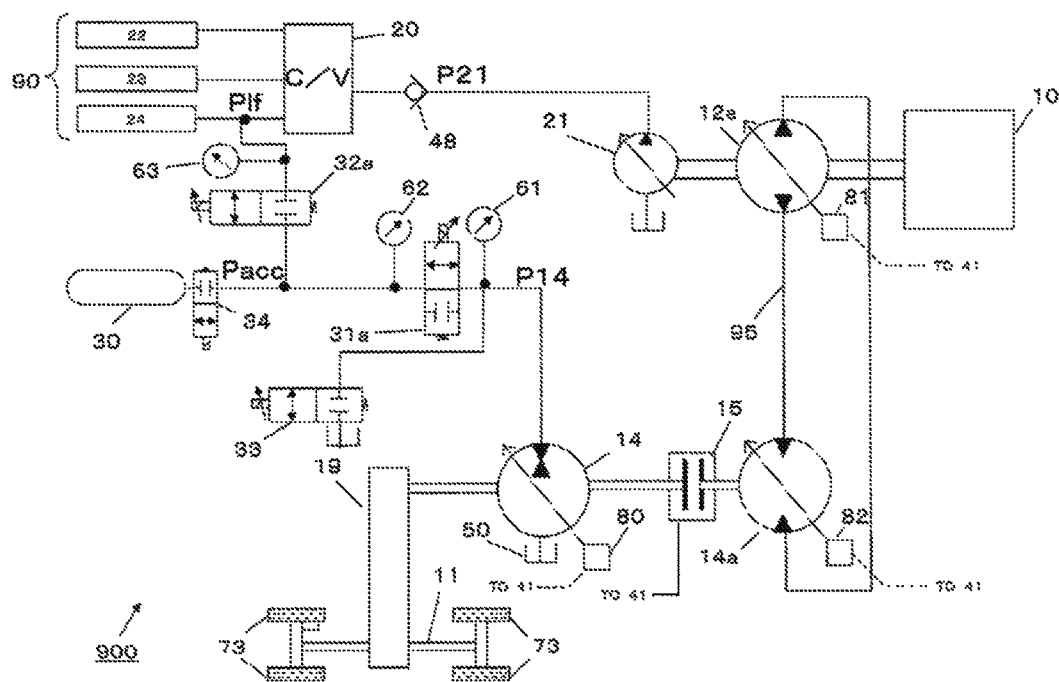
FIG. 29 is an overall block diagram of a wheel loader related to the ninth embodiment of the present invention.

Although a wheel loader 900 related to the ninth embodiment will be explained below, the portion duplicating with respective embodiments described above will be marked with a same reference sign, and explanation thereof will be omitted. FIG. 29 is an overall block diagram of the wheel loader related to the ninth embodiment of the present invention. As shown in FIG. 29, the wheel loader 900 related to the ninth embodiment differs from the eighth embodiment in the configuration in terms that the first solenoid valve 31a and the second solenoid valve 32a are made the proportional type one. According to the ninth embodiment, because the flow rate can be controlled properly compared to the eighth embodiment in which the solenoid valves 31, 32 are made the opening/closing valve, the energy loss can be reduced, and the fuel efficiency improves further.

As explained above, the wheel loader related to respective embodiments of the present invention can regenerate the energy of the time of deceleration of the vehicle and the time of lift moving-down by the accumulator 30 and can utilize the regenerative energy for acceleration of the vehicle or the moving-up motion of the lift, therefore the loss of the energy can be suppressed, and the fuel efficiency can be improved. Also, because a simple configuration of the branching flow path 150, the accumulator 30, the solenoid valves 31 to 34, and so on is enough, the cost can be reduced.

Further, respective embodiments of the wheel loader described above are the exemplifications for explanation of the present invention, and are not intended to limit the scope of the present invention to these embodiments only. A person with an ordinary skill in the art can implement the present invention by other various aspects without departing from the substance of the present invention. In addition, the present invention can be applied also to working machines other than the wheel loader such as a hydraulic shovel for example.

REFERENCE SIGNS LIST

10: Engine (prime mover)
11: Propeller shaft (travel device)
12: Traveling hydraulic pump (second hydraulic pump)
14: Traveling hydraulic pump-motor (hydraulic pump-motor)
15: Hydraulic power clutch (second clutch)
16: First gear (gear)
17: Second gear (gear)
18: Mechanical power clutch (first clutch)
19: Transmission (travel device)
21: Front operation hydraulic pump (first hydraulic pump)
22: Bucket cylinder
23: Steering cylinder
24: Lift cylinder (hydraulic actuator)
30: Accumulator
31: First solenoid valve (first opening/closing valve)
32: Second solenoid valve (second opening/closing valve)
33: Third solenoid valve
34: Fourth solenoid valve
41: Controller (control device)
61: First pressure detector
62: Second pressure detector
63: Third pressure detector
64: Fourth pressure detector
65: Fifth pressure detector
70: Accelerator pedal (target speed command device)
71: Speed detector
72: Operating lever (operation device)
73: Wheels 73 (travel device)
90: Working device
100: Wheel loader
111: Lift arm
112: Bucket
150: Branching flow path
151: Discharge flow path

The invention claimed is:

1. A working machine comprising:
a prime mover;
a travel device;
a working device including a hydraulic actuator;
a first hydraulic pump that operates by power from the prime mover and feeds a hydraulic oil to the hydraulic actuator;
a hydraulic pump-motor that drives the travel device; and
a control device,
the working machine further comprising:
a branching flow path through which the hydraulic oil flows between the hydraulic actuator and the hydraulic pump-motor;
an accumulator arranged in the branching flow path;
a first opening/closing valve arranged between the accumulator and the hydraulic pump-motor; and
a second opening/closing valve arranged between the accumulator and the hydraulic actuator,
wherein the control device selectively introduces the hydraulic oil from the hydraulic actuator and the hydraulic oil from the hydraulic pump-motor to the accumulator and accumulates pressure by controlling opening/closing of the first opening/closing valve and the second opening/closing valve.

2. The working machine according to claim 1,
wherein the control device feeds the hydraulic oil accumulated in the accumulator selectively to the hydraulic actuator and the hydraulic pump-motor by controlling opening/closing of the first opening/closing valve and the second opening/closing valve.

3. The working machine according to claim 2, further comprising:
a target speed command device that outputs a target speed command with respect to the travel device;
an operation device that outputs a working command with respect to the working device;
a first pressure detector that detects pressure between the first opening/closing valve and the hydraulic pump-motor;
a second pressure detector that detects pressure between the first opening/closing valve and the second opening/closing valve; and
a third pressure detector that detects pressure between the second opening/closing valve and the hydraulic actuator.

4. The working machine according to claim 3,
Wherein, when the target speed command from the target speed command device is a deceleration command and a first pressure detected by the first pressure detector is higher than a second pressure detected by the second pressure detector, the control device introduces the hydraulic oil from the hydraulic pump-motor to the accumulator and accumulates pressure by actuating the hydraulic pump-motor as a pump, opening the first opening/closing valve, and closing the second opening/closing valve.

5. The working machine according to claim 4, further comprising:
   a second hydraulic pump that operates by power from the prime mover and feeds the hydraulic oil to the hydraulic pump-motor; and
   a fourth pressure detector that detects discharge pressure of the second hydraulic pump,
   wherein, when the target speed command from the target speed command device is an acceleration command and the second pressure detected by the second pressure detector is higher than a fourth pressure detected by the fourth pressure detector, the control device feeds the hydraulic oil accumulated in the accumulator to the hydraulic pump-motor by actuating the hydraulic pump-motor as a motor, opening the first opening/closing valve, and closing the second opening/closing valve.

6. The working machine according to claim 3,
   wherein, when the working command from the operation device is a load reduction command and a third pressure detected by the third pressure detector is higher than a second pressure detected by the second pressure detector, the control device introduces the hydraulic oil from the actuator to the accumulator and accumulates pressure by opening the second opening/closing valve and closing the first opening/closing valve.

7. The working machine according to claim 6, further comprising:
   a fifth pressure detector that detects a discharge pressure of the first hydraulic pump,
   wherein, when the working command from the operation device is a load increase command and the second pressure detected by the second pressure detector is higher than a fifth pressure detected by the fifth pressure detector, the control device feeds the hydraulic oil accumulated in the accumulator to the hydraulic actuator by opening the second opening/closing valve and closing the first opening/closing valve.

8. The working machine according to claim 3, further comprising:
   a gear that transmits power from the prime mover to the travel device;
   a first clutch arranged between the travel device and the gear;
   a second clutch arranged between the travel device and the hydraulic pump-motor; and
   a speed detector that detects an actual speed of the travel device,
   wherein, when the actual speed detected by the speed detector is within a predetermined low speed range, the control device drives the travel device by the hydraulic pump-motor by disconnecting the first clutch and connecting the second clutch, whereas when the actual speed detected by the speed detector exceeds the low speed range, the control device drives the travel device by the prime mover by connecting the first clutch and disconnecting the second clutch.

* * * * *